LINE IDENTIFICATION TROUBLE INDICATOR

Filed May 19, 1950 20 Sheets-Sheet 1

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 2

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 3

INVENTOR
I. H. HENRY
BY C. Mattice
ATTORNEY

INVENTOR
I.H. HENRY
BY C. Mathie
ATTORNEY

INVENTOR
I. H. HENRY
BY C. Mattie
ATTORNEY

INVENTOR
I. H. HENRY
BY C. Mathie
ATTORNEY

LINE IDENTIFICATION TROUBLE INDICATOR

Filed May 19, 1950 20 Sheets-Sheet 7

INVENTOR
I. H. HENRY
BY C. Mattice
ATTORNEY

INVENTOR
I. H. HENRY
BY C. Mallice
ATTORNEY

Oct. 27, 1953 I. H. HENRY 2,657,271

LINE IDENTIFICATION TROUBLE INDICATOR

Filed May 19, 1950 20 Sheets-Sheet 9

INVENTOR
I. H. HENRY
BY C. Mattice
ATTORNEY

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 11

INVENTOR
I. H. HENRY
BY

ATTORNEY

Oct. 27, 1953 I. H. HENRY 2,657,271

LINE IDENTIFICATION TROUBLE INDICATOR

Filed May 19, 1950 20 Sheets-Sheet 12

INVENTOR
I. H. HENRY
BY C. Mathie
ATTORNEY

Oct. 27, 1953 I. H. HENRY 2,657,271

LINE IDENTIFICATION TROUBLE INDICATOR

Filed May 19, 1950 20 Sheets-Sheet 13

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 14

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 15

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 16

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 17

INVENTOR
I. H. HENRY
BY C. Mattice
ATTORNEY

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 19

INVENTOR
I. H. HENRY
BY C. Mattice
ATTORNEY

Oct. 27, 1953 I. H. HENRY 2,657,271

LINE IDENTIFICATION TROUBLE INDICATOR

Filed May 19, 1950 20 Sheets-Sheet 20

INVENTOR
I. H. HENRY
BY
C. Mathie
ATTORNEY

Patented Oct. 27, 1953 2,657,271

UNITED STATES PATENT OFFICE 2,657,271

LINE IDENTIFICATION TROUBLE INDICATOR

Israel H. Henry, East Orange, N. J., assignor to Bell Telephone Laboratories, Incorporated, New York, N. Y., a corporation of New York Application May 19, 1950, Serial No. 163,029

7 Claims. (Cl. 179—18)

This invention relates to dial telephone systems and has for its object to guard against errors in charging for calls in such systems.

In telephone systems employing automatic message accounting equipment, the identity of the subscriber's line to which a call is to be charged must also be determined automatically. In certain cross-bar telephone systems the line switches which extend the calling line to the district junctor are controlled by a line link control circuit, which cooperates with a sender link control circuit to operate the sender link switches to connect the calling line with an idle subscriber sender. In order to operate the proper line switches, the line link control circuit identifies the location of the calling line and then passes this identification through the sender link control circuit to the selected subscriber sender. Subsequently this information is transferred to a transverter, which employs a translator to translate the line location into a directory number, and controls a recorder to record the directory number on the accounting tape.

The line location identification is made up of three items of information, namely, the horizontal group in which the calling line appears, the vertical group in which the calling line appears, and the vertical file which shows the position of the line within the vertical group. The vertical group identification includes three digits which may be tens and units digits of the frame number and the position of the vertical group on the frame or may be an arbitrary three digit number given to the vertical group. In all, therefore, five items of information appear at the transverter, each of which is recorded in the two-out-of-five code. In the transverter a check is made that each item received comprises at least two elements and not more than two elements, and if such is not the case a trouble indicator is called in which makes a record of the items as received.

If the frame identification is correctly received, the tracing of trouble on one of the other items is not too difficult, but if a part of the frame identification is incorrect, the tracing of the trouble is a tremendous task.

To simplify the tracing of such troubles, in accordance with the present invention, means is provided for checking all line identifications for correctness of code as they pass through a sender link control circuit.

The trouble indication set up on the transverter trouble indicator includes the identity of the district junctor over which the call was extended and the frame on which the district junctor is located. There is a sender link and controller circuit for each district junctor frame and a trouble indicator common to sender link control circuits.

In accordance with the present invention means is provided in the sender link and controller circuit trouble indicator to indicate the line location for each call which brings in that trouble indicator.

In addition means is provided to make the line location registers of the sender link and controller circuit trouble indicator individual to a particular controller circuit and while so made individual to check that each register receives two and only two code signals.

Under this condition the release of the sender link and controller circuit is made to depend on the correct operation of the line location registers.

While the line location registers are associated with a particular sender link and controller circuit, the trouble indicator may be used by other sender link and controller circuits to record troubles. If the line location registers detect a fault in the line identification circuits, the trouble indicator is immediately connected with the particular sender link and controller circuit to indicate all of the equipment in use on the call, which includes the line link frame. If the trouble indicator is in use with another sender link and controller circuit it is forcibly released therefrom.

These and other features of the invention will be more clearly understood from a consideration of the following description in connection with the drawing in which.

*Operation of controller circuits*

The operation of the line link and controller circuit and sender link and controller circuit is described in detail in the application of W. W. Carpenter et al., Serial No. 759,402, filed July 7, 1947, and therefore will only be briefly outlined at this time. Except for the figure identifying numerals, the same designations have been used for convenience in referring to the Carpenter et al. application.

When a subscriber, for example the subscriber at substation S(1) initiates a call, the associated line relay L000(1) is operated, grounding the two conductors 51 and 52. Ground on conductor 52, which is common to all lines appearing in one switch, initiates the operation of the line link and controller circuit operating relays HA0(5) and HB0(5) to identify the horizontal group within which the calling line terminals are located. Assuming that the home control circuit is available, the operation of relay HA0(5) operates the link control connector represented by box 500 after which gate relay GTA(5) is operated, followed by relay HG0(2) individual to the identified horizontal group.

With relay HG0(2) operated, conductor 52 is extended to the winding of vertical group relay V0(10), to identify the vertical group within which the calling line is located, which operates, followed by relays H0(2), VS(10) and VE(10). With relays HG0(2), VE(10) and VO(10) operated, relays HM00(1) and LR00(1) are operated, individual to the group of ten lines appearing in the one switch and therefore occupying the identified vertical group within the identified horizontal group.

With relay LR00(1) operated, conductor 51, which is individual to line S(1) is extended to the winding of relay LT0(10) to identify the vertical file, that is, the position of the calling line in the identified group of ten lines.

As soon as relay HG0(2) is operated, the test for a sender link and controller circuit is started. This test includes testing for a group of district junctors including idle junctors, a sender link and controller circuit which is idle, idle sender links and groups of senders including idle senders. When a sender link and controller circuit and district junctor have been selected, relays D0(16) and DF0(16) in the line link and controller circuit are operated to connect the line link and controller circuit with the sender link and controller circuit, and relay G(6) in the sender link and controller circuit is operated to extend a plurality of control circuits from the line link and controller circuit to the sender link and controller circuit.

One of the relays BA(6) or BB(6) is then operated by the line link control circuit to select a subgroup of district junctors. Assuming that relay BA(6) is operated, it in turn operates relay DA(6), after which a preferred idle junctor is selected, operating one of the relays D0(13) to D9(13), for example, relay D0(13).

Figure 1:
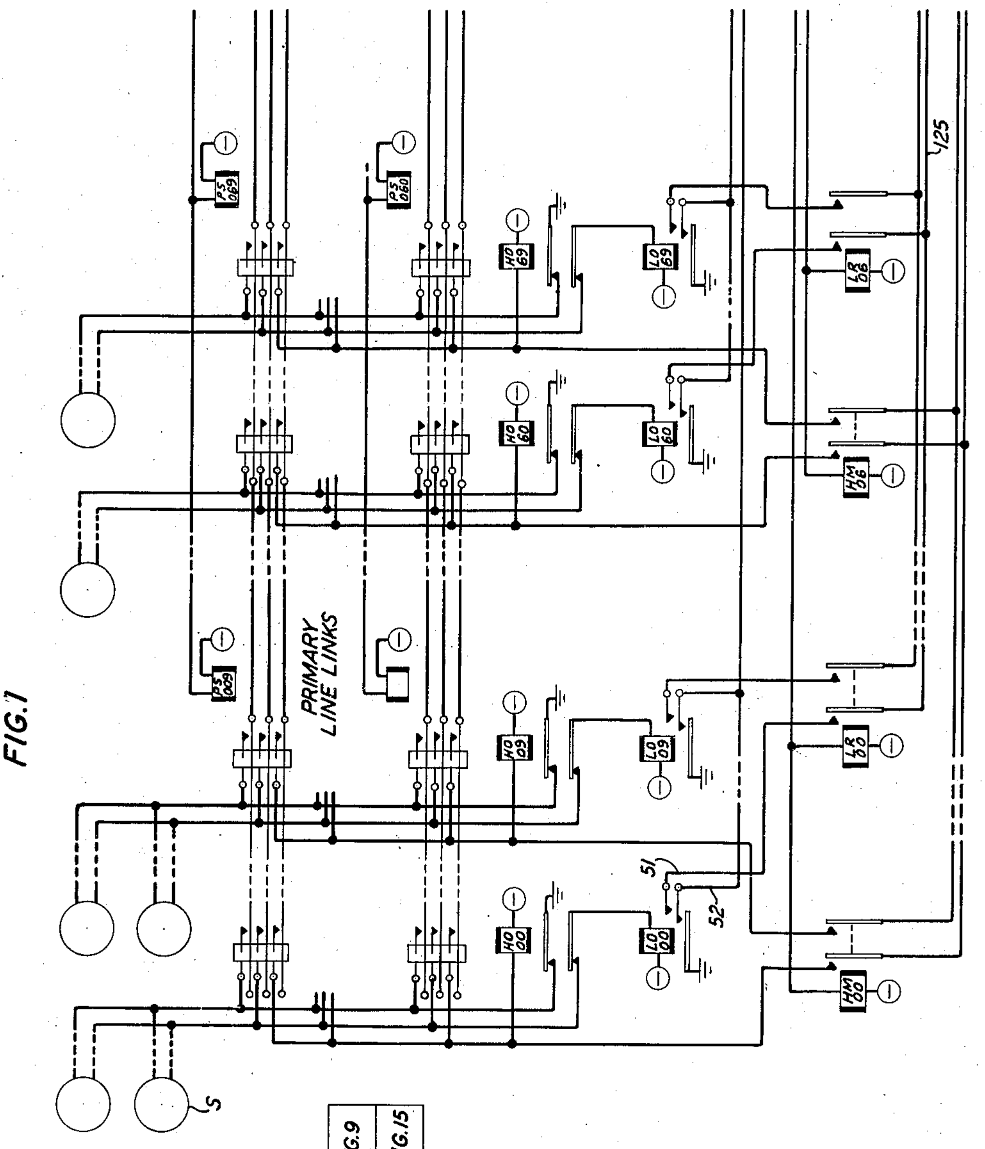
Figs. 1 and 2 show a plurality of subscribers' lines, primary and secondary line switches for serving such lines and a district junctor to which the lines may be connected.
Figure 21:
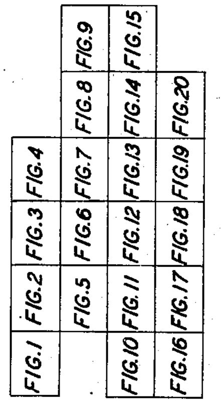
Fig. 21 shows the manner in which Figs. 1 to 20 should be arranged.
Figure 2:
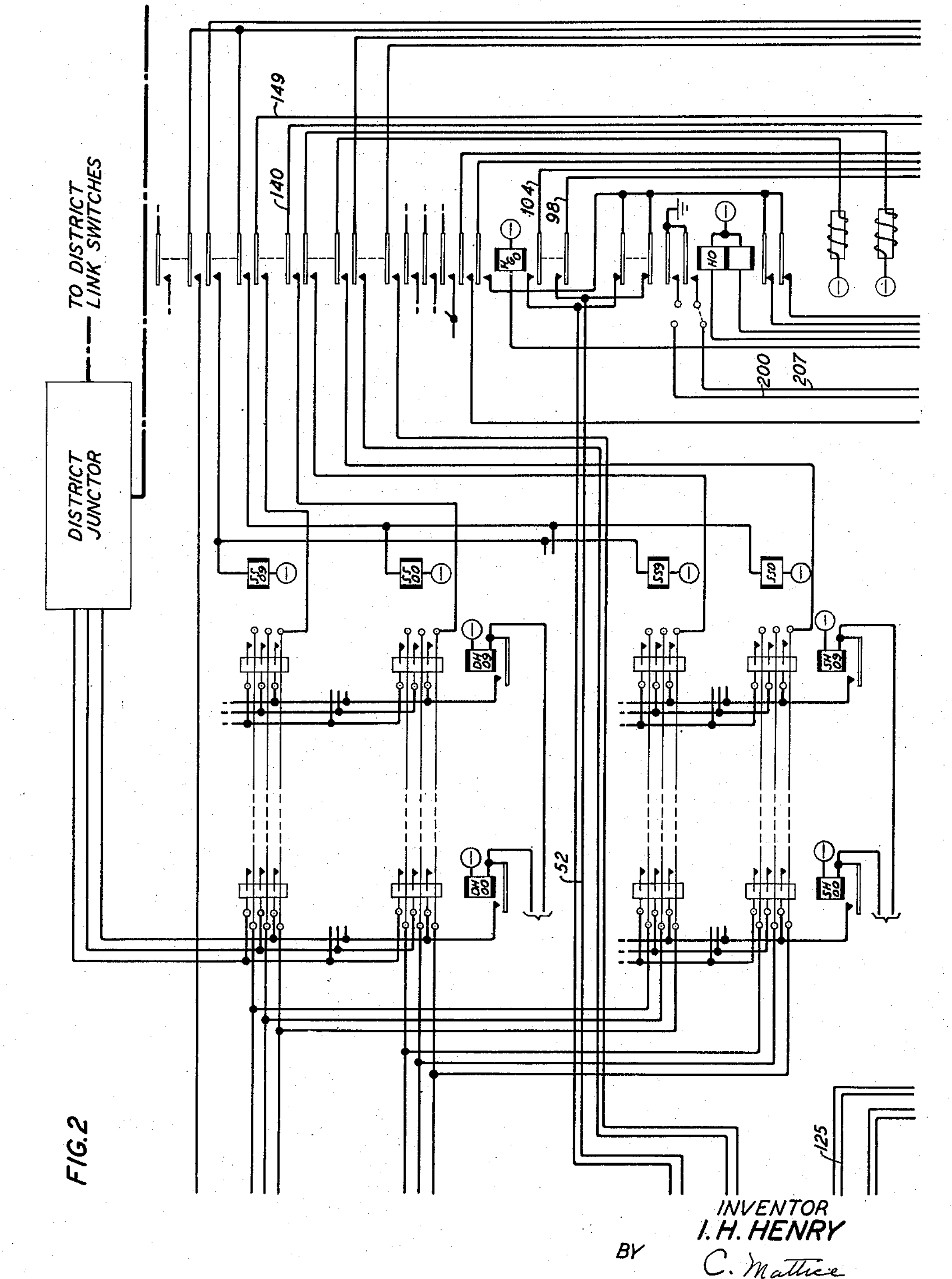
Figure 3:
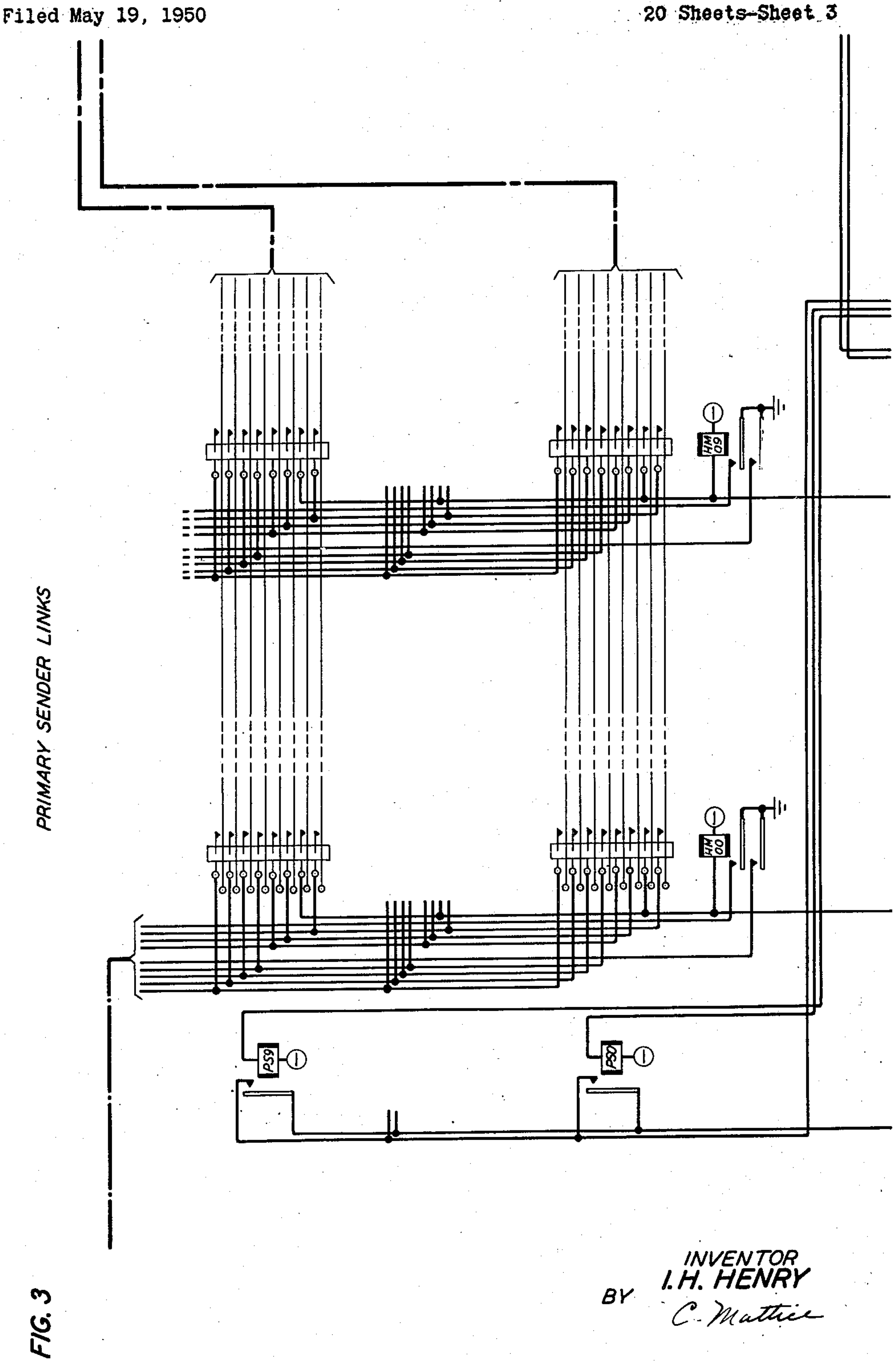
Figs. 3 and 4 show the primary and secondary sender links for connecting a calling line with a subscriber sender.
Figure 4:
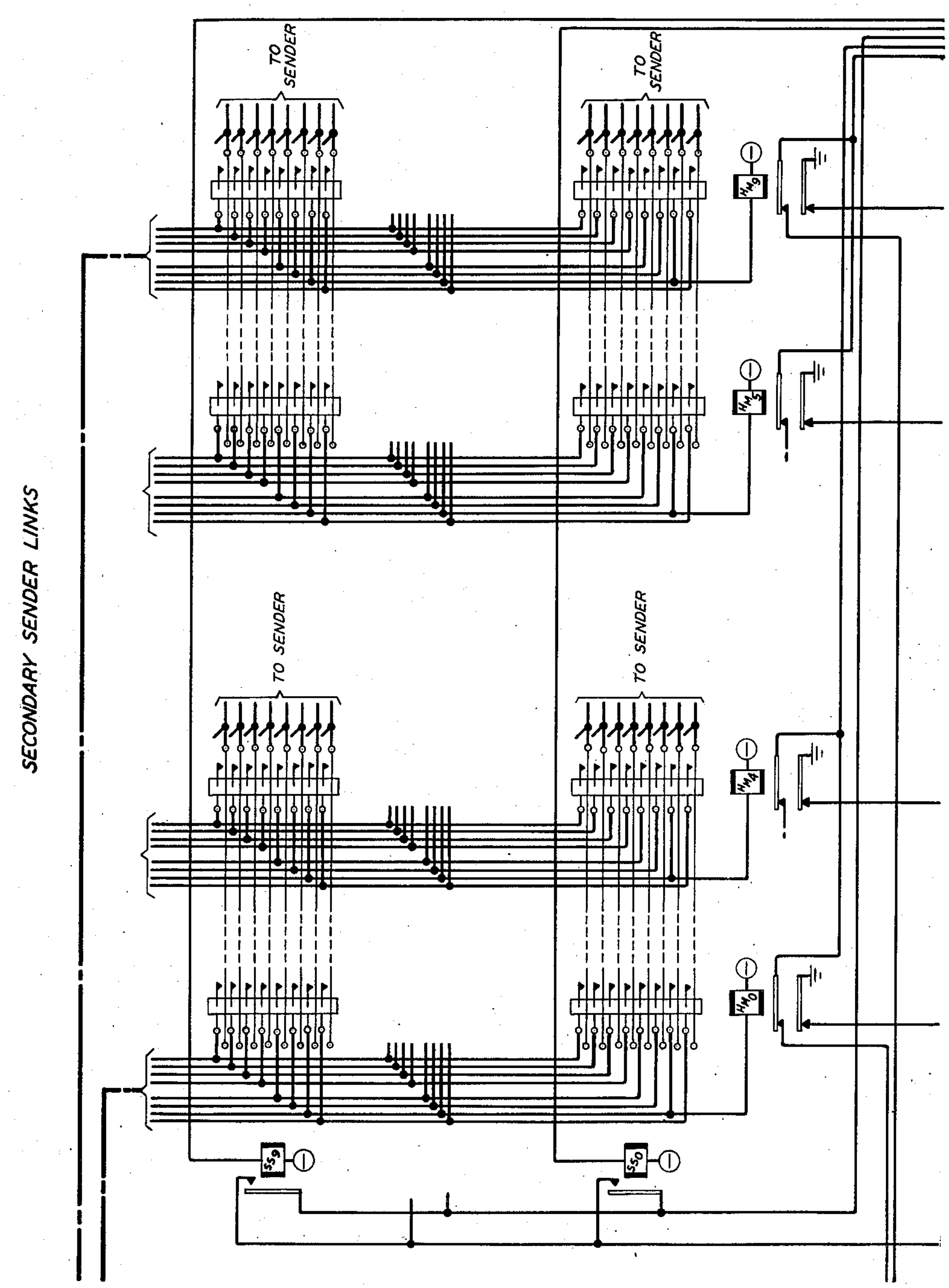
Figure 5:
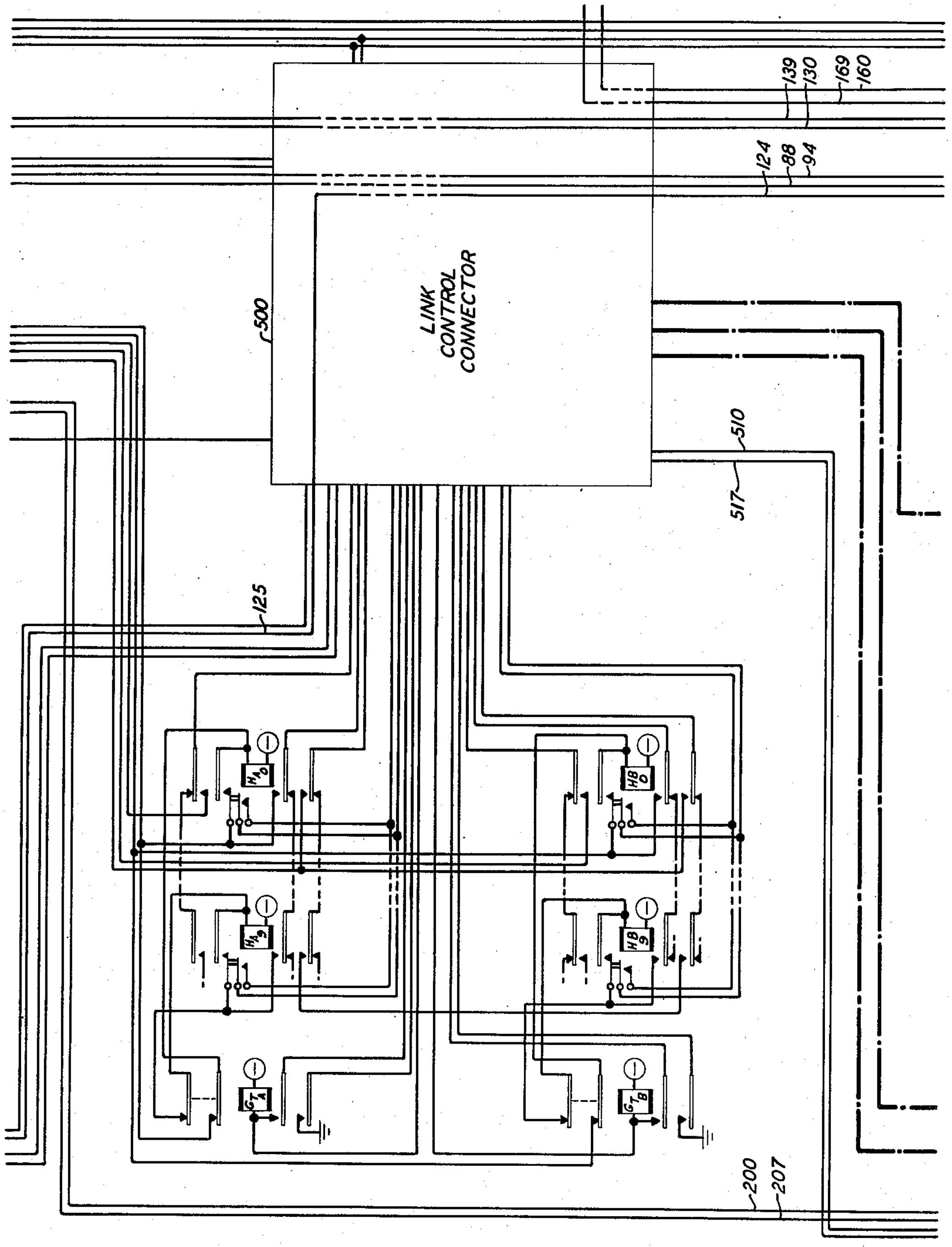
Fig. 5 shows the line link circuit and the link control connector.
Figure 6:
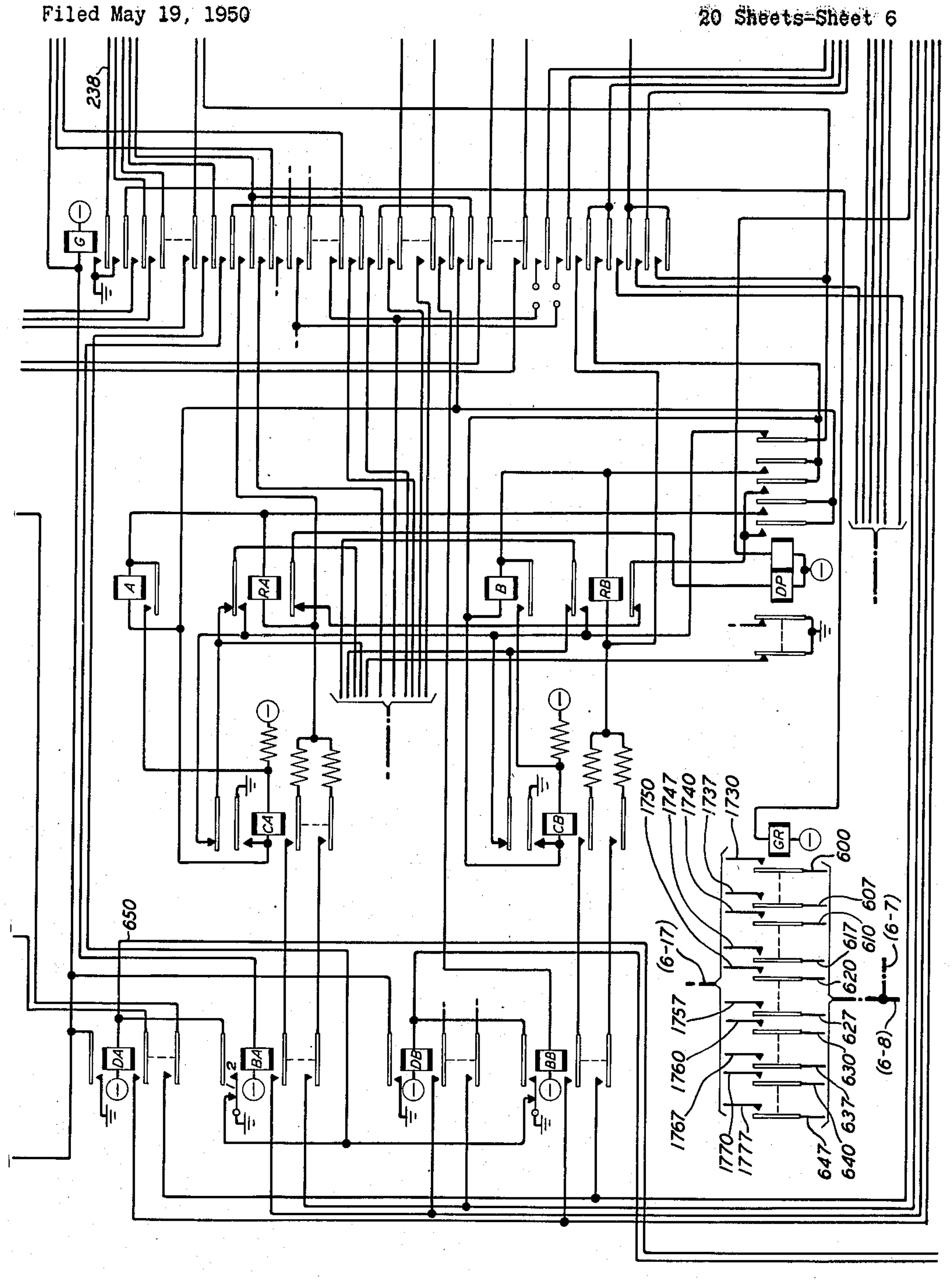
Figs. 6, 7, 8, 9 and 13 show the sender link control circuit.
Figure 7:
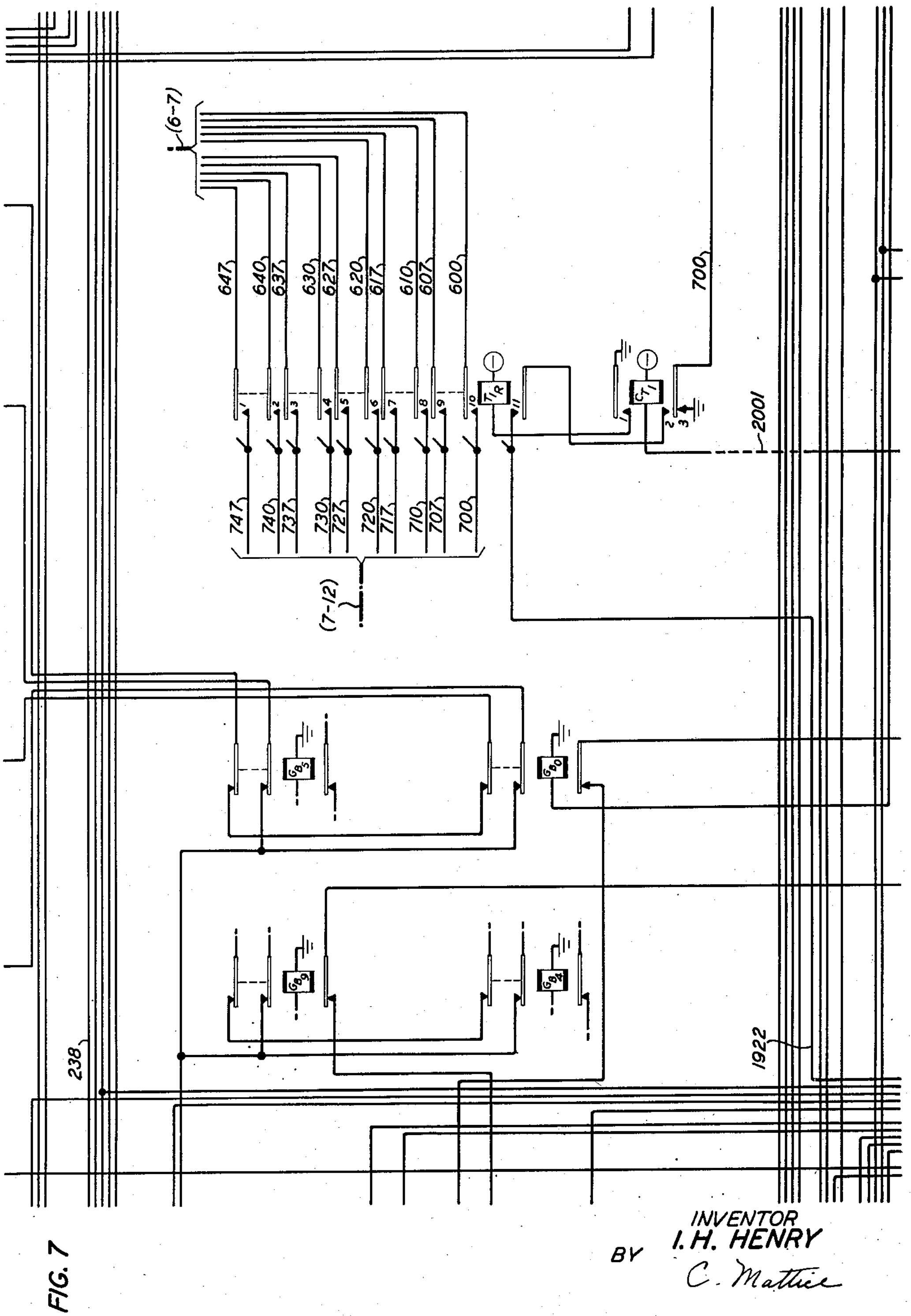
Figure 8:
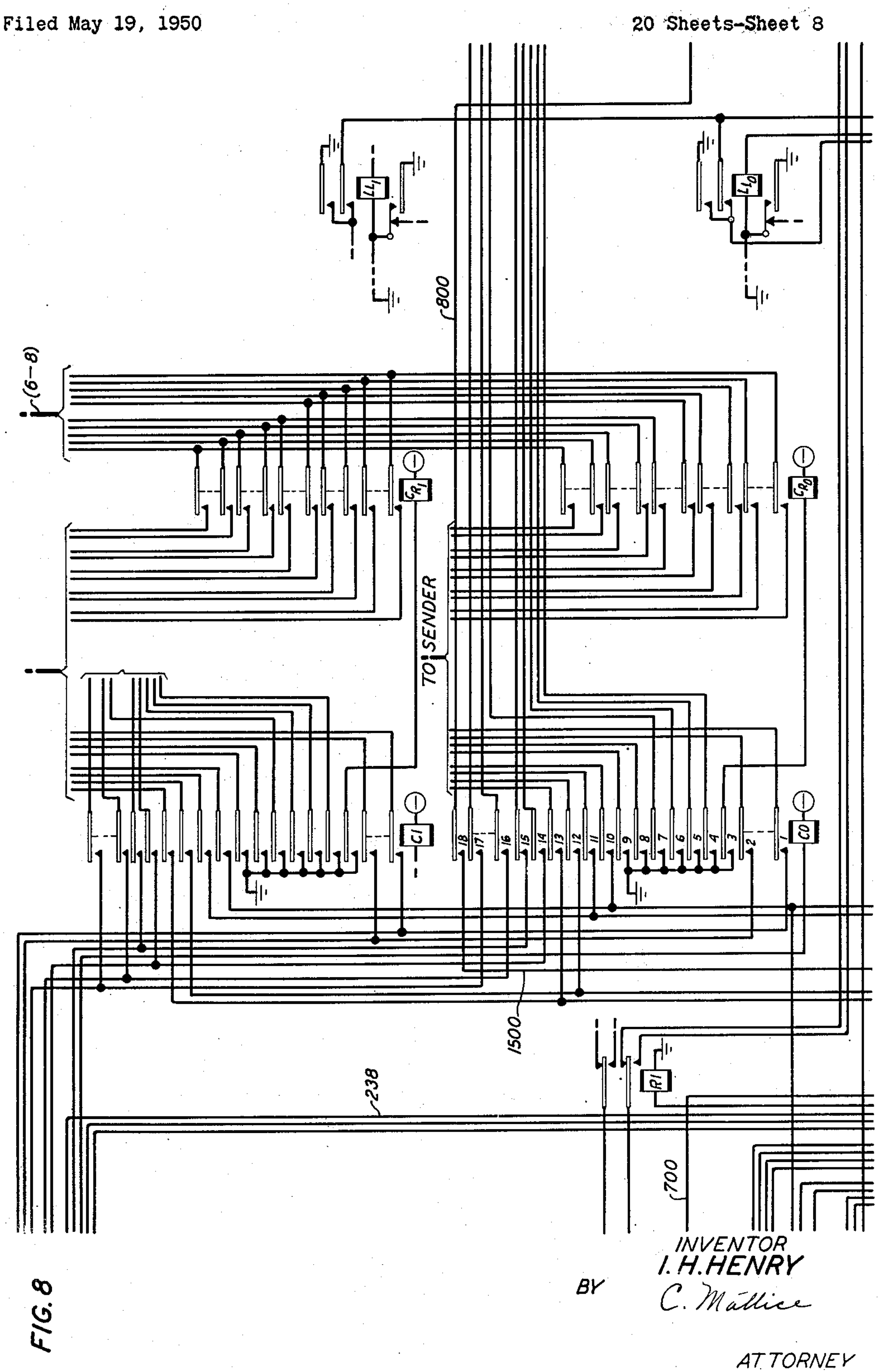
Figure 9:
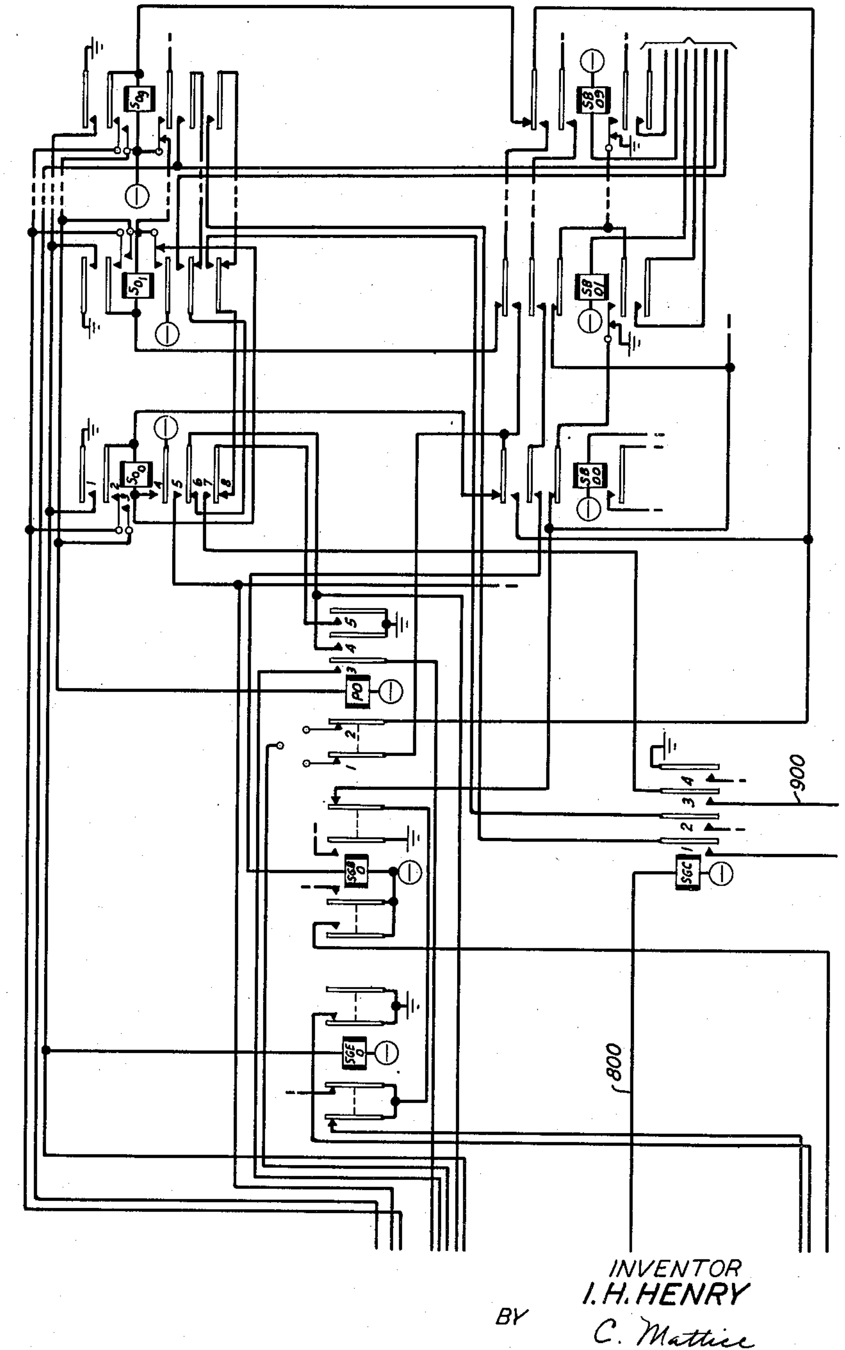
Figure 10:
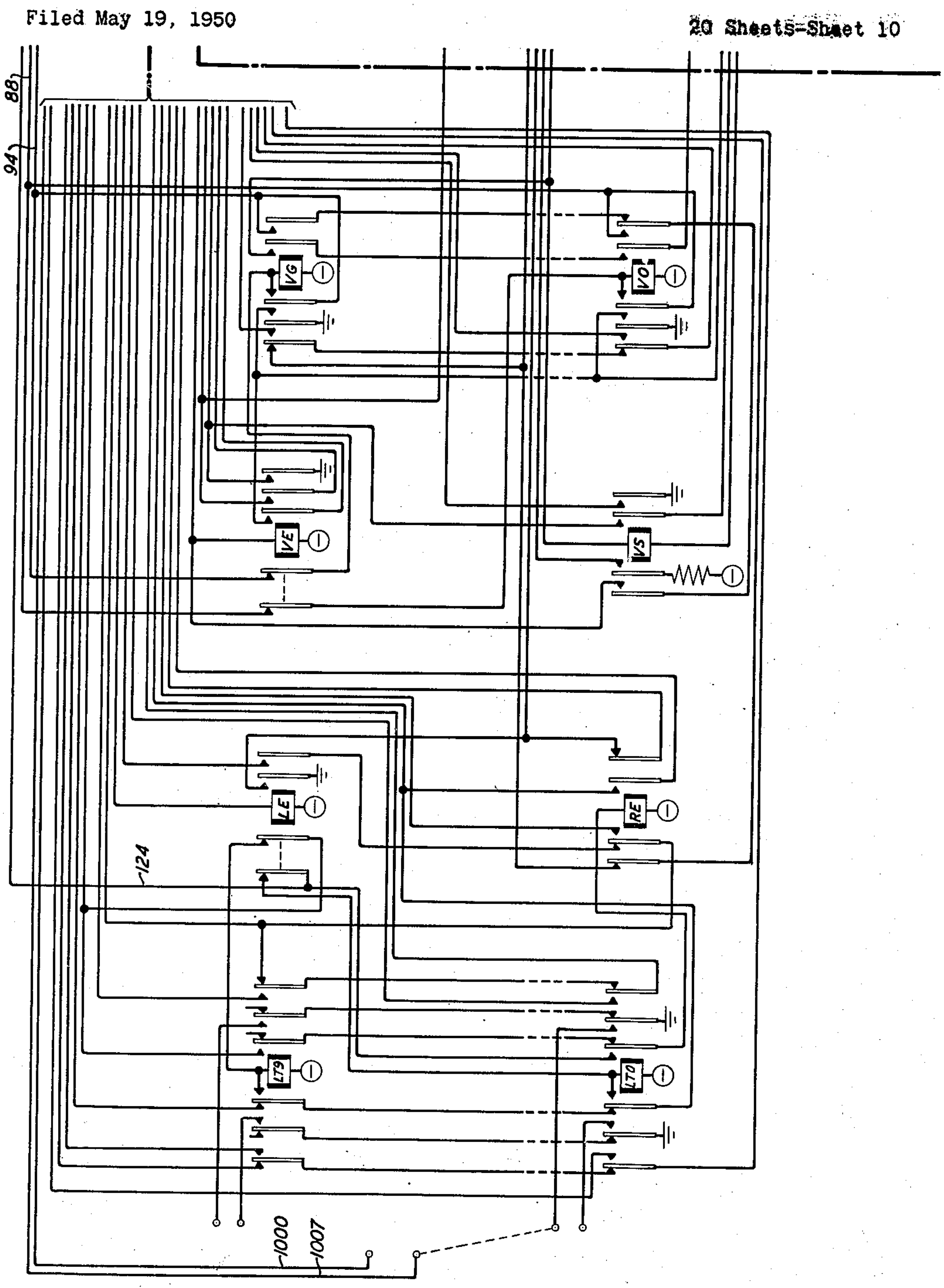
Figs. 10, 11, 16 and 17 show the line link control circuit.
Figure 11:
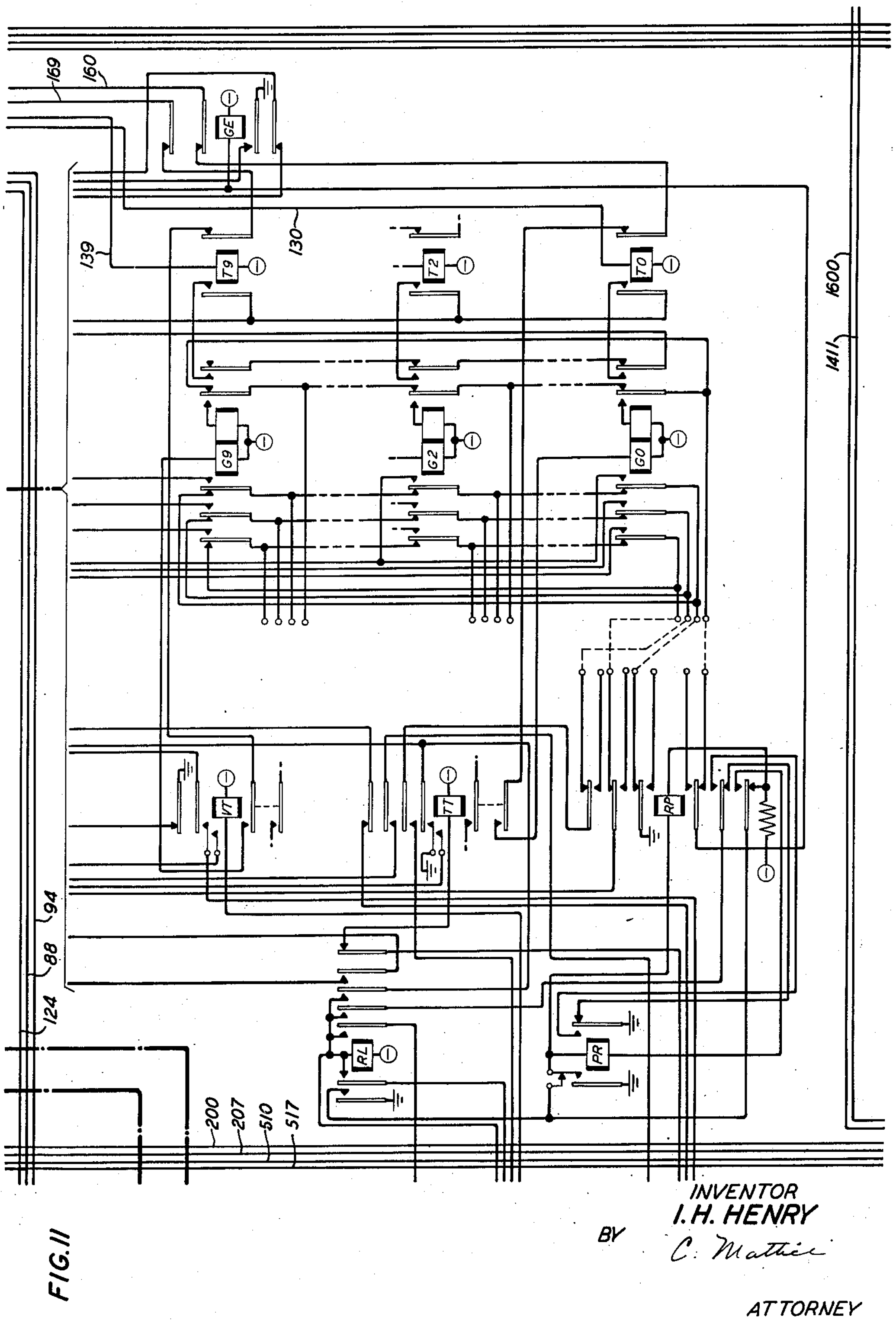

The operation of relay G(6) also initiates the selection of a group of senders resulting in the operation and locking of one of the relays SG0(13) to SG9(13), for example relay SG0(13) which in turn operates relay C0(8) which is individual to the selected group of senders and serves to set up a plurality of control circuits between the sender link and controller circuit and the selected group of senders. With relay C0(8) operated, an individual sender is selected, operating one of the relays S00(9) to S09(9), for example relay S00(9). When an idle sender has been selected, the primary and secondary sender link switches (Figs. 3 and 4) are operated to connect the selected sender with the selected district junctor after which relay RL(14) is operated and the control circuits release.

During the operation of the line link and controller circuit and the sender link and controller circuit, the calling line is identified in accordance with its location on the line link frame and this identification is transferred to the sender. For this purpose, relay H0(2), which is operated under the control of the horizontal group identifying relay HA0(5), is used to provide the horizontal group information. Relay VC0(17) is operated under the control of the vertical group identifying relay V0(10) to provide the vertical group information and the vertical file identifying relay LT0(10) also provides the vertical file information. Two contacts on each of these relays are cross-connected to two out of a corresponding group of five conductors to set up the information according to the two-out-of-five code, which will be explained hereinafter. Relay VC0(17) is equipped with two additional pairs of contacts which are cross-connected in accordance with the two digits of the number of the frame which the relay serves and which may be assumed to be 00. When a group of district junctors has been selected, the corresponding district group relay, for example relay DG0(17) is operated to extend the five sets of conductors to the sender link and controller circuit.

The two-out-of-five code uses five elements numbered 0, 1, 2, 4 and 7, the two elements used to represent a digit adding to the value of the digit except in the case of the digit 0 which is represented by elements 4 and 7. Since the code for the digit 0 in the two-out-of-five code is 4—7, relay VC0(17) grounds frame tens conductor 1707 and the "four" conductor in the group 1700 to 1707, frame units conductor 1717 and the "four" conductor in the group 1710 to 1717, vertical group conductor 1727 and the "four" conductor in the group 1720 to 1727. Relay H0(2) grounds horizontal group conductor 207 and the "four" conductor in the group 200 to 207 and relay LT0(10) grounds conductor 1007 and the "four" conductor in the group 1000 to 1007.

In the sender link and controller circuit, relay GR(6) is operated by relay G(6) and relay CR0(8) is operated by relay C0(8). With relays GR(16) and CR0(8) operated, the five sets of identifying conductors are extended to the sender where a registration is made of the line identification. Subsequently the sender transfers the line identification to the automatic message accounting equipment.

It will be seen that no means is provided to determine whether these line identification circuits are complete in the two control circuits. This is also true in the sender, but in the automatic message accounting equipment as above mentioned the circuits are checked before a record is made and a trouble record made if the information is incomplete. However, the location of the cause of such incompleteness may be extremely difficult to determine. Means has therefore been provided to use the sender link trouble indicator to assist in finding the trouble.

*General use of sender link and controller circuit trouble indicator*

The sender link trouble indicator is ordinarily called in when the sender link and controller circuit fails to release within a reasonable time. As soon as the group relay G(6) operates, it grounds conductor 238 causing operations in the part of the sender control circuit represented by rectangle 1400 which result in grounding conductor 241 and operating off-normal relay ON1(13). Relay ON1(13) in turn grounds conductor 1300 completing a circuit to battery through the winding of relay TS(14) causing the latter relay to operate.

Relay TS(14) starts timing the operation of the sender link and controller circuit by connecting battery, through resistance, to the conductors 1401, 1402, 1403 and 1404 extending to the windings of relays W(14), Z(14), WA(14) and ZA(14). The first closure of the contact of interrupter CB(14), following the operation of relay TS(14), completes a circuit from ground over interrupter CB(14), conductor 1405, contact 1 of relay W(14), winding of relay W(14) to battery on conductor 1401. Relay W(14) operates and locks over its contact 2 to ground, and at the same time connects ground over its contact 2 to the winding of relay Z(14) preparing an operating circuit for relay Z(14), which is ineffective at this time since ground connected to conductor 1405 by interrupter CB(14) extends over contact 3 of relay Z(14) to conductor 1402 in shunt of the winding of relay Z(14) so that relay Z(14) cannot operate.

When interrupter CB(14) opens its contact, relay Z(14) operates. With relay Z(14) operated, a circuit is closed from ground over contact 2 of relay Z(14), contact 4 and winding of relay WA(14) to battery on conductor 1403. Relay WA(14) operates and locks to ground over its contact 5, at the same time preparing a circuit for relay ZA(14) from ground at contact 5 of relay WA(14), winding of relay ZA(14) to battery on conductor 1404. However, ground is also connected over contact 2 of relay Z(14), contact 5 of relay ZA(14) to conductor 1404 in shunt of the winding of relay ZA(14) so that this relay cannot operate at this time.

The next closure of interrupter CB(14) connects ground to conductor 1405 and thence over contact 4 of relay Z(14) to conductor 1401 in shunt of the winding of relay W(14) causing relay W(14) to release. Relay W(14) in releasing opens the operating circuit of relay Z(14) but relay Z(14) remains operated in a circuit which may be traced from battery on conductor 1402, winding of relay Z(14), contact 1 of relay W(14) to ground on conductor 1405.

When interrupter CB(14) opens its contact relay Z(14) releases and opens the shunt around the winding of relay ZA(14) so that the latter relay operates.

The next closure of the contact of interrupter CB(14) again operates relay W(14) which prepares the circuit for relay Z(14). When the interrupter contact opens and relay Z(14) operates, ground is connected over contact 2 of relay Z(14), contact 6 of relay ZA(14) to conductor 1403 in shunt of the winding of relay WA(14) which releases, relay ZA(14) being held operated in a circuit from battery on conductor 1404, winding of relay ZA(14), contact 4 of relay WA(14) to ground over contact 2 of relay Z(14).

With relay ZA(14) operated and relay WA(14) released a circuit is closed from battery through the winding of relay TA(14), contact 2 of relay ZA(14) to ground at contact 1 of relay WA(14). Relay TA(14) operates in this circuit and locks in a circuit from battery through its winding, contact 7 of relay TS(14) to ground at contact 1 of relay TA(14).

If the control circuit does not complete its functions and return to normal, relays W(14) and Z(14) continue to function under the control of interrupter CB(14). When relay Z(14) is next released, relay ZA(14) also releases. At the next operation of relay Z(14), relay WA(14) is again operated.

With relays TA(14) and WA(14) operated, a circuit is closed from ground over contact 2 of relay WA(14), contact 4 of relay TA(14), to conductor 1406. If the trouble indicator is available this circuit extends over the contact of relay TB(14), contact 1 of relay TIB(14), to battery through the winding of relay TI(14). Relay TI(14), when operated calls in the trouble indicator. If the trouble indicator has been taken out of service, ground is connected over contact 1 of relay TI(14) to battery through the winding of relay TIB(14), holding that relay operated. Therefore, when ground is connected to conductor 1406 as above described a circuit is completed from conductor 1406 over contact 12 of relay TI(14), contact 3 of relay TIB(14), normally closed contacts of keys AR(14) and HR(14) to battery through the winding of relay AR(14) to bring about the automatic release of the sender link and controller circuit.

With relay TI(14) operated, a circuit is closed from battery through resistance ST(14), contact 8 of relay TI(14), conductor 1409, winding of relay FP0(20), contact 5 of relay FP19(20) and of other intermediate FP relays to ground over contact 3 of relay FP39(20). There is one FP relay for each of the forty sender link and controller circuits served by this trouble indicator and these relays are wired in a chain circuit as above traced which gives preference for operation to the higher numbered relays. Assuming that no other sender control circuit is seeking to use the trouble indicator, relay FP0(20) operates in the circuit above traced, and locks to ground over its contact 5. One or more higher numbered FP relays may later operate, but are ineffective as long as relay FP0(20) is operated.

With relay FP0(20) operated a circuit is closed from ground at contact 3 of relay RM1(19), contact 1 of relay IRL(19), conductor 1900, contact 2 of relay FP0(20), conductor 2000, contact 7 of relay TI(14), conductor 1410 to battery through the winding of relay CI(15). Relay CI(15) in turn grounds conductor 1500, operating relay TIC(14) and closing a circuit over contact 18 of relay CO(8) and conductor 800 to battery through the winding of relay SGC(9), operating the latter relay.

In addition, with relay FP0(20) operated, a circuit is closed from ground at contact 2 of relay CT(19), contact 1 of relay NK4(19), conductor 1901, contacts 7 of relays ET0(20), ET9(20), ET39(20) and intermediate relays, contact 4 of relay FP0(20), conductor 2001, to battery through the winding of relay CTI(7). Relay CTI(7) operates, closing an obvious circuit for relay TIR(7).

Relays CI(15), TIC(14), SGC(9) and TIR(7) close a plurality of circuits for transmitting information concerning the equipment involved and the identity of the calling line to the trouble indicator. Other multicontact relays not shown are also operated in parallel with relay CI(15) to supply information regarding the circuits indicated by box 1400.

It was assumed that the calling line was identified by grounding conductors 1700, 1717, 1727, 207 and 1007 and the associated "four" conductors. Conductors 1000 to 1007 are extended through the link control connector 500 to conductors 510 to 517. With relay DG0(17) operated, conductors 1700 to 1707, 1710 to 1717, 1720 to 1727, 200 to 207 and 510 to 517 are connected respectively to conductors 1730 to 1737, 1740 to 1747, 1750 to 1757, 1760 to 1767 and 1770 to 1777 which extend through cable 6–17 to the contacts of group relay GR(6) in the sender link control circuit where they are connected to conductors 600 to 607, 610 to 617, 620 to 627, 630 to 637 and 640 to 647, respectively. The latter conductors extend through cable 6–8 to contacts of relay CR0(8), which serves to transmit this line identification to the sender, and in parallel therewith through cable 6–7 to the contacts of relay TIR(7) which transmits the line identification to the trouble indicator. Relay TIR(7) connects conductors 600 to 607, 610 to 617, 620 to 627, 630 to 637, and 640 to 647 to conductors 700 to 707, 710 to 717, 720 to 727, 730 to 737 and 740 to 747, respectively, the latter conductors extending through cable 7–12 to the windings of relays FT0(18) to FT7(18), FU0(18) to FU7(18), VG0(18) to VG7(18), HG0(12) to HG7(12) and VF0(12) to VF7(12). Since it was assumed that the "four" and "seven" conductors in each group were grounded, relays FT4(18), FT7(18), FU4(18), FU7(18), VG4(18), VG7(18), HG4(12), HG7(12), VF4(12) and VF7(12) will be operated.

The following table shows the two-out-of-five code as applied to the frame tens registration:

| Frame Tens Digit | Register Relays Operated |
|---|---|
| 0 | FT4, FT7 |
| 1 | FT0, FT1 |
| 2 | FT0, FT2 |
| 3 | FT1, FT2 |
| 4 | FT0, FT4 |
| 5 | FT1, FT4 |
| 6 | FT2, FT4 |
| 7 | FT0, FT7 |
| 8 | FT1, FT7 |
| 9 | FT2, FT7 |

In addition, with relay DF0(16) operated, which is individual to the group of line links which connect the line link frame with the district junctor frame, a circuit is closed from ground at contact 5 of relay TIC(14), conductor 1411, contact 1 of relay DF0(16), conductor 1600 to battery through the upper winding of relay LL0(15) to indicate the line link group in use. With relay BA(6) operated to select the A subgroup of the group of district junctors, ground is connected over contact 2 of relay BA(6), conductor 650, contact 1 of relay TIC(14), conductor 1412 to battery through the upper winding of relay DSG0(15) to indicate the subgroup of district junctors selected. With relay D0(13) operated to select a district junctor, a circuit is closed from battery, contact 7 of relay D0(13), conductor 1301, contact 4 of relay CI(15) to ground through the upper winding of relay D0(15) to indicate the district junctor selected. With relay SG0(13) operated to select a group of senders, a circuit is closed from ground over the locking circuit of relay SG0(13), conductor 1302, contact 7 of relay CI(15) to battery through the upper winding of relay SG0(15) to indicate the sender group selected. With relay S0(9) operated, a circuit is closed from ground over contact 5 of relay P0(9), contact 7 of relay S0(9), contact 3 of relay SGC(9), conductor 900, to battery through the upper winding of relay S0(15) to indicate which sender was selected in the selected group.

These indications have been shown as typical and others are set up which have been omitted since they are not concerned in the invention.

Returning to the seizure of the trouble indicator, in addition to operating relay FP0(20), relay TI(14) also closes a circuit from ground over its contact 3, and conductor 1408 to battery through the winding of relay DL0(20) operating the latter relay. Relay CI(15) in operating closes a circuit from ground over its contact 9, and conductor 1501 to battery through the winding of relay C0(20), operating that relay. Relays DL0(20) and C0(20) lock over conductor 2002 to ground at contact 3 of relay IRL(19).

Relay DL0(20) prepares the timing circuit of the trouble indicator by connecting ground over its contact 2 to conductor 2003, thereby setting up two circuits through the windings of relay CT(19), one through resistance B(19), over contact 3 of jack PG(19), through the lower winding of relay CT(19) to battery over contact 1 of jack PG(19). The second extends from conductor 2003, over contact 2 of jack PG(19), resistance A(19), condenser A(19) and the upper winding of relay CT(19) to battery over contact 1 of jack PG(19). However, resistance A(19) and condenser A(19) are initially shunted by contact 5 of relay TS(19) so that the two circuits are effective to hold the armature of relay CT(19) against its contact 2.

Relay C0(20) at its contact 4 closes a circuit over conductor 2004, to battery through the winding of relay TS(19). Relay TS(19) operates, removing the shunt from the resistance A(19) and condenser A(19), and condenser A(19) charges in the circuit through the lower winding of relay CT(19) to hold contact 2 of that relay closed for a time interval, at the end of which the upper winding becomes effective to close contact 1. This time interval is designed to cover the operating time of the recording relays. When relay CT(19) closes its contact 1, it completes a circuit over conductor 1918, contact 1 of relay TS(19), conductor 1919, contact 7 of relay NK3(19) to battery through the winding of relay RM1(19). Relay RM1(19) operates in this circuit and connects ground over its contact 1 and contact 1 of relay NK2(19) to conductor 1918 to provide a locking circuit for itself. Relay RM1(19) also closes a second locking circuit for itself which extends over contact 4 of relay NK3(19), contact 2 of relay RM1(19) and conductor 1920 to ground at contact 3 of relay DL0(20) and contact 6 of relay FP0(20).

Figure 12:
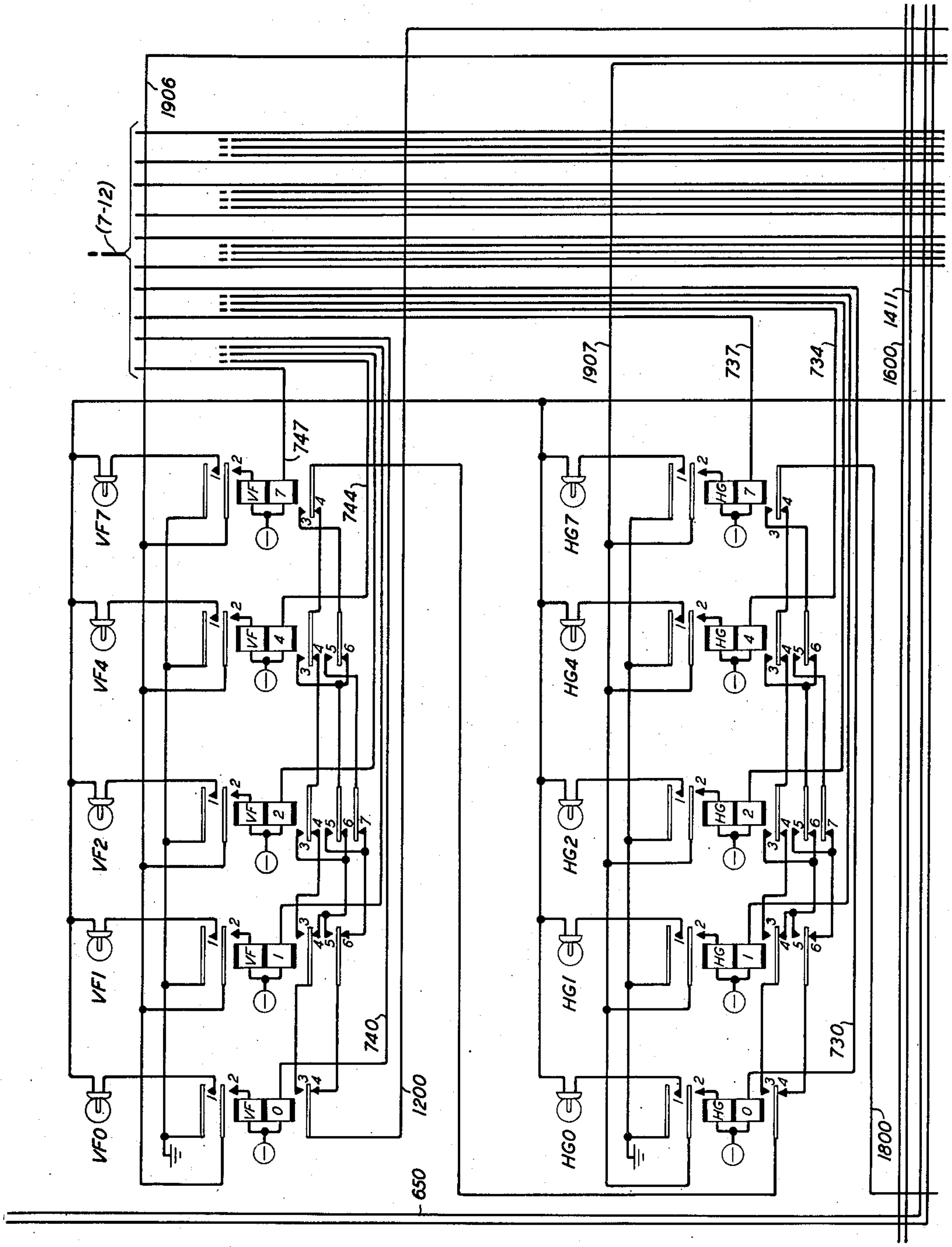
Figs. 12, 14, 15, 18, 19 and 20 show the trouble indicator.
Figure 13:
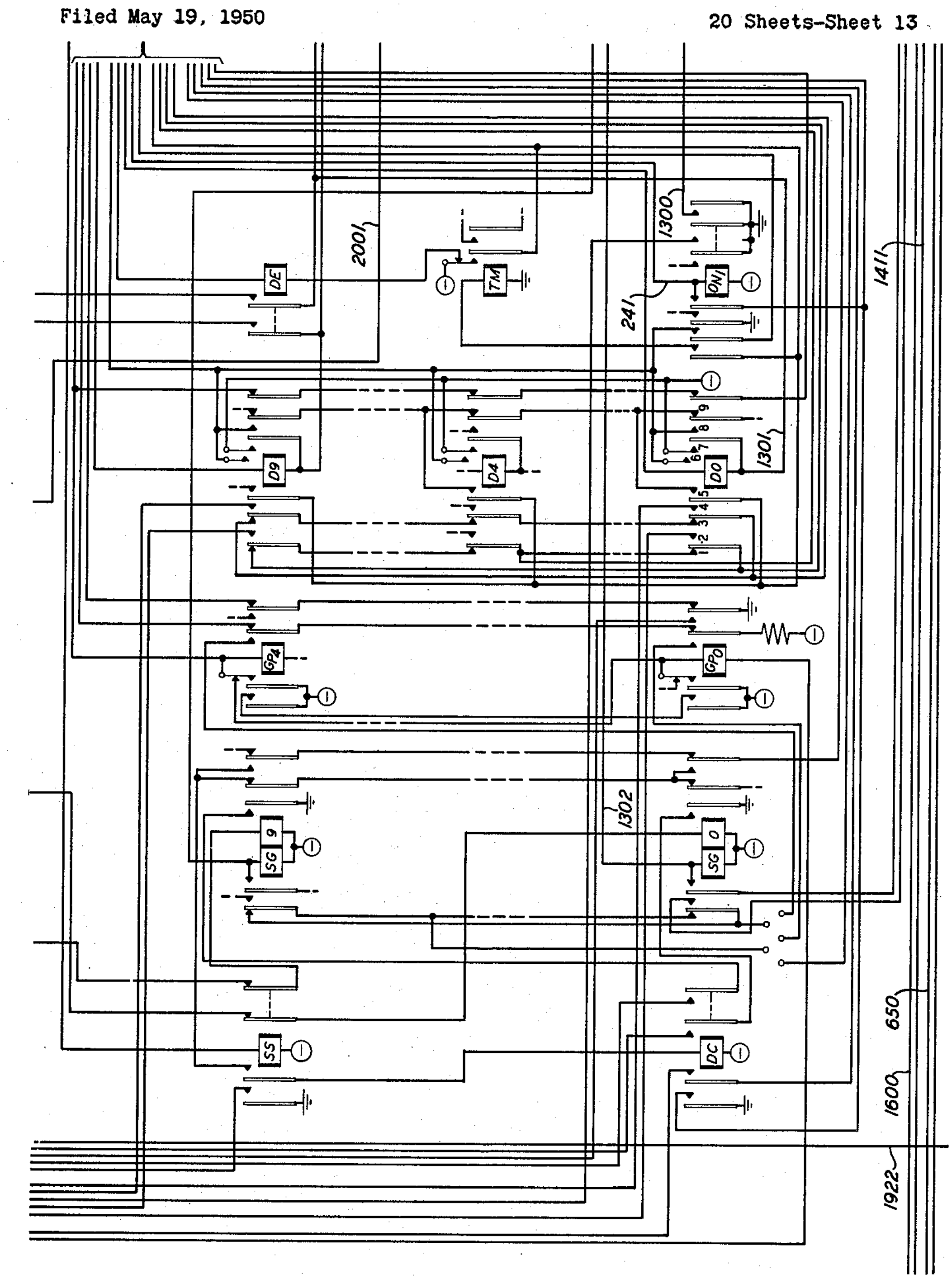
Figure 14:
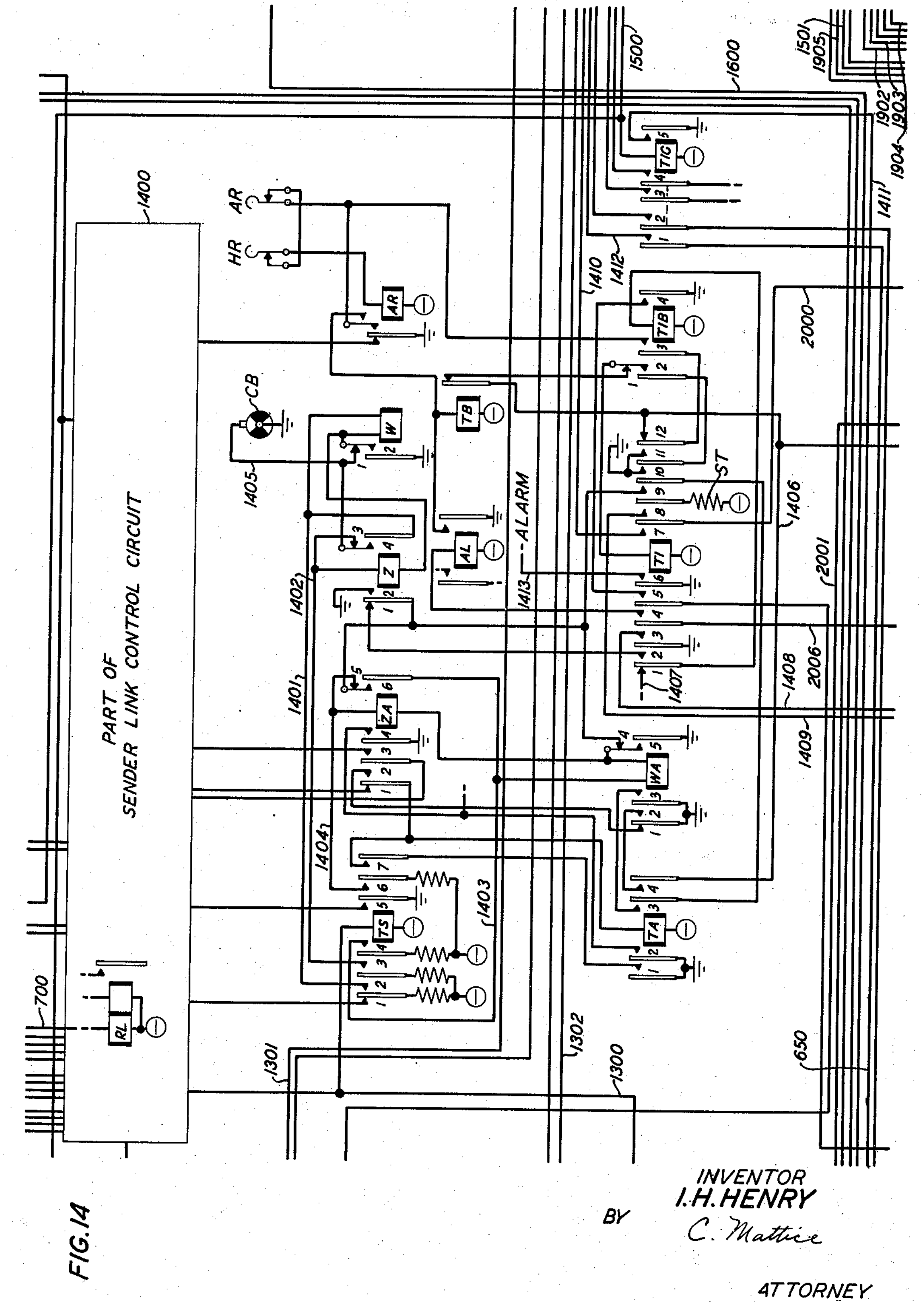
Figure 15:
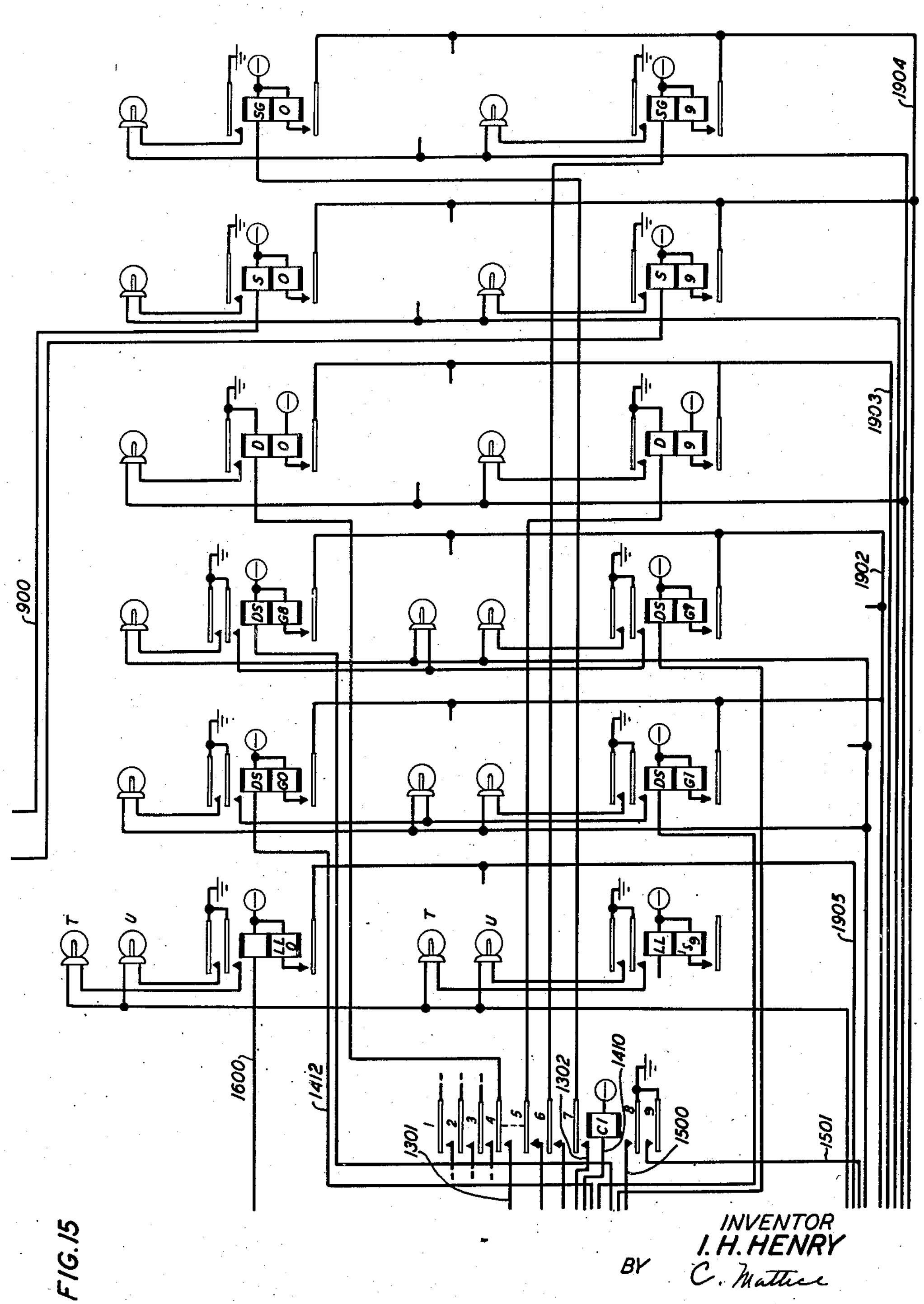
Figure 16:
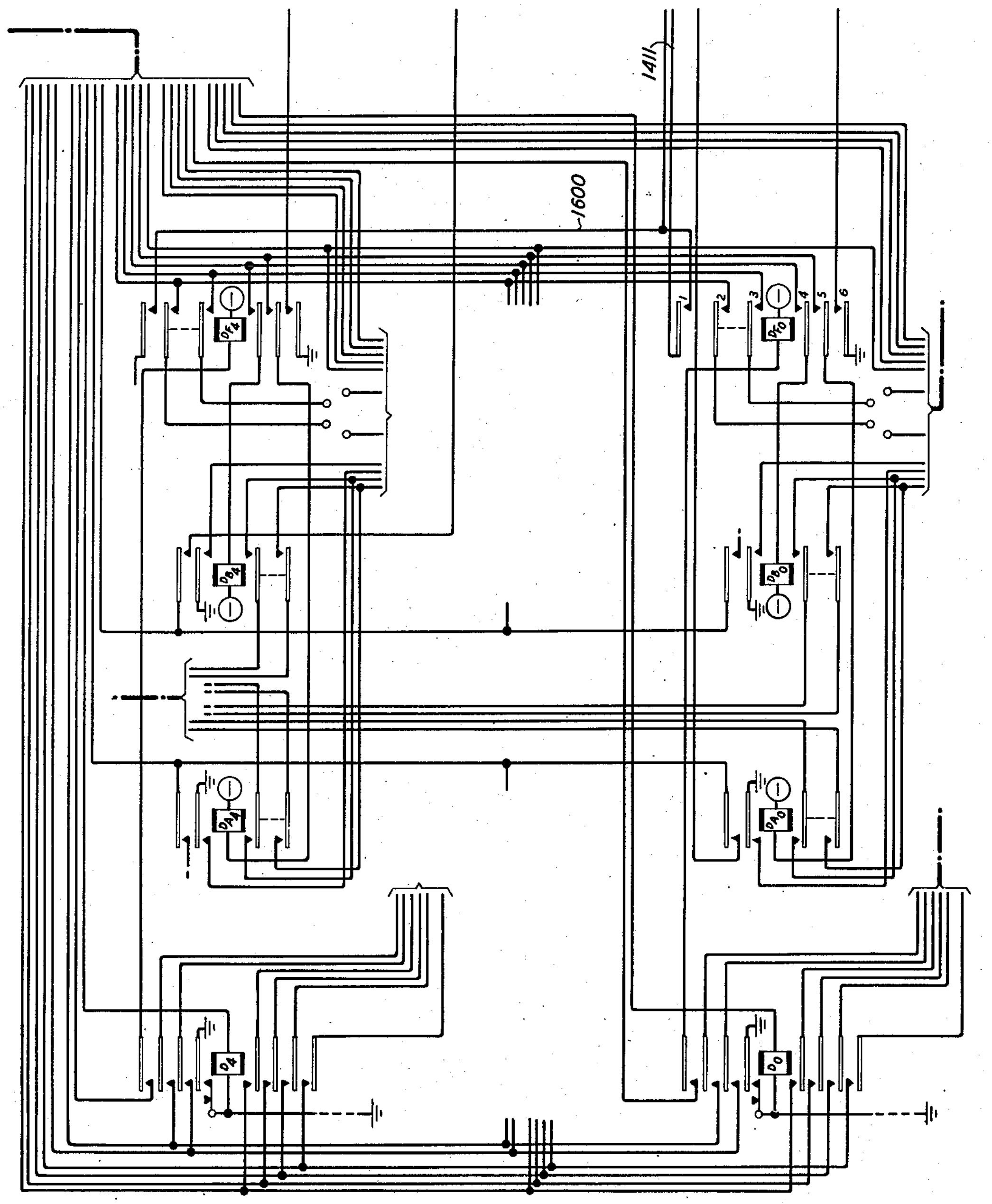
Figure 17:
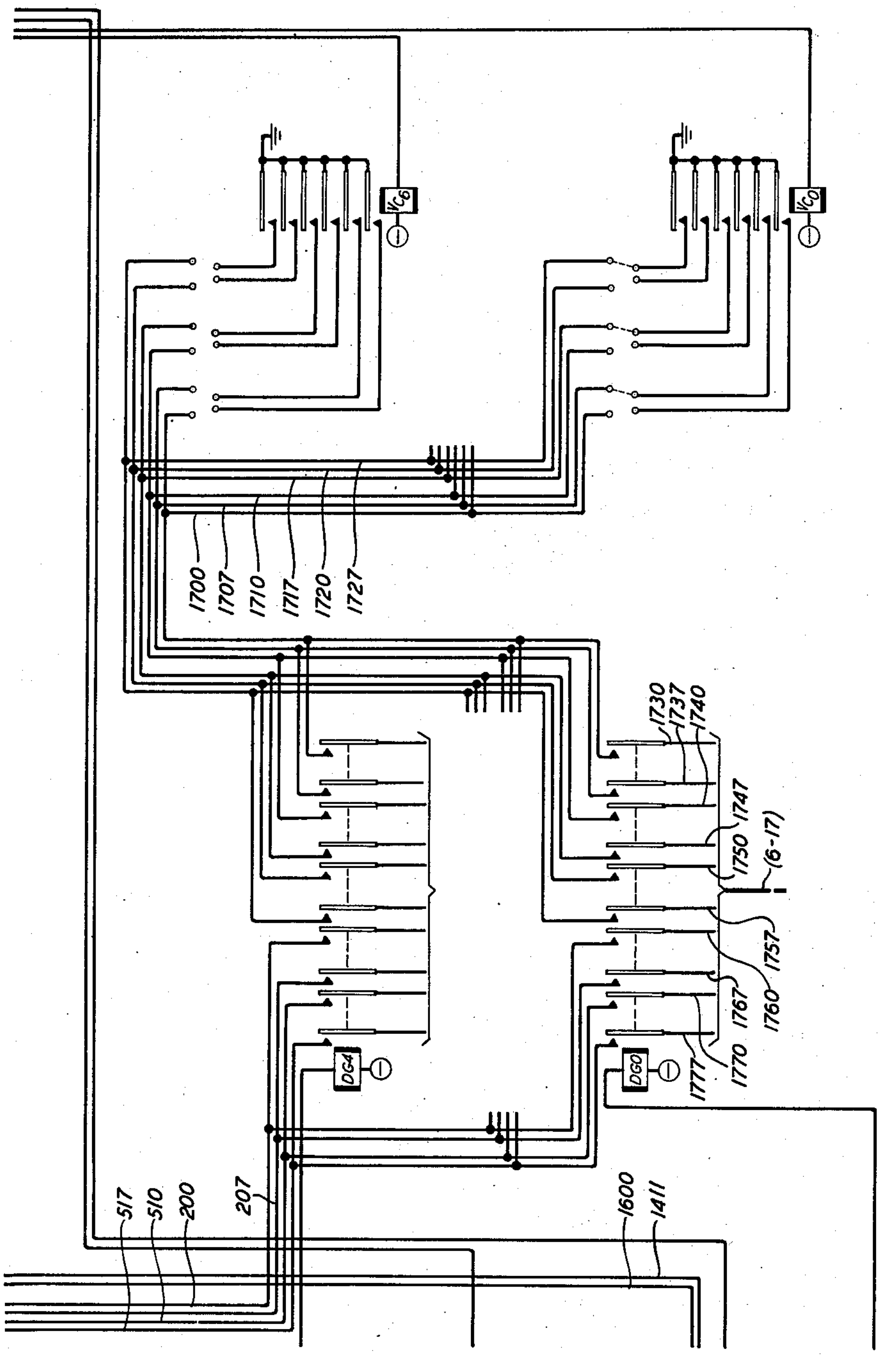
Figure 18:
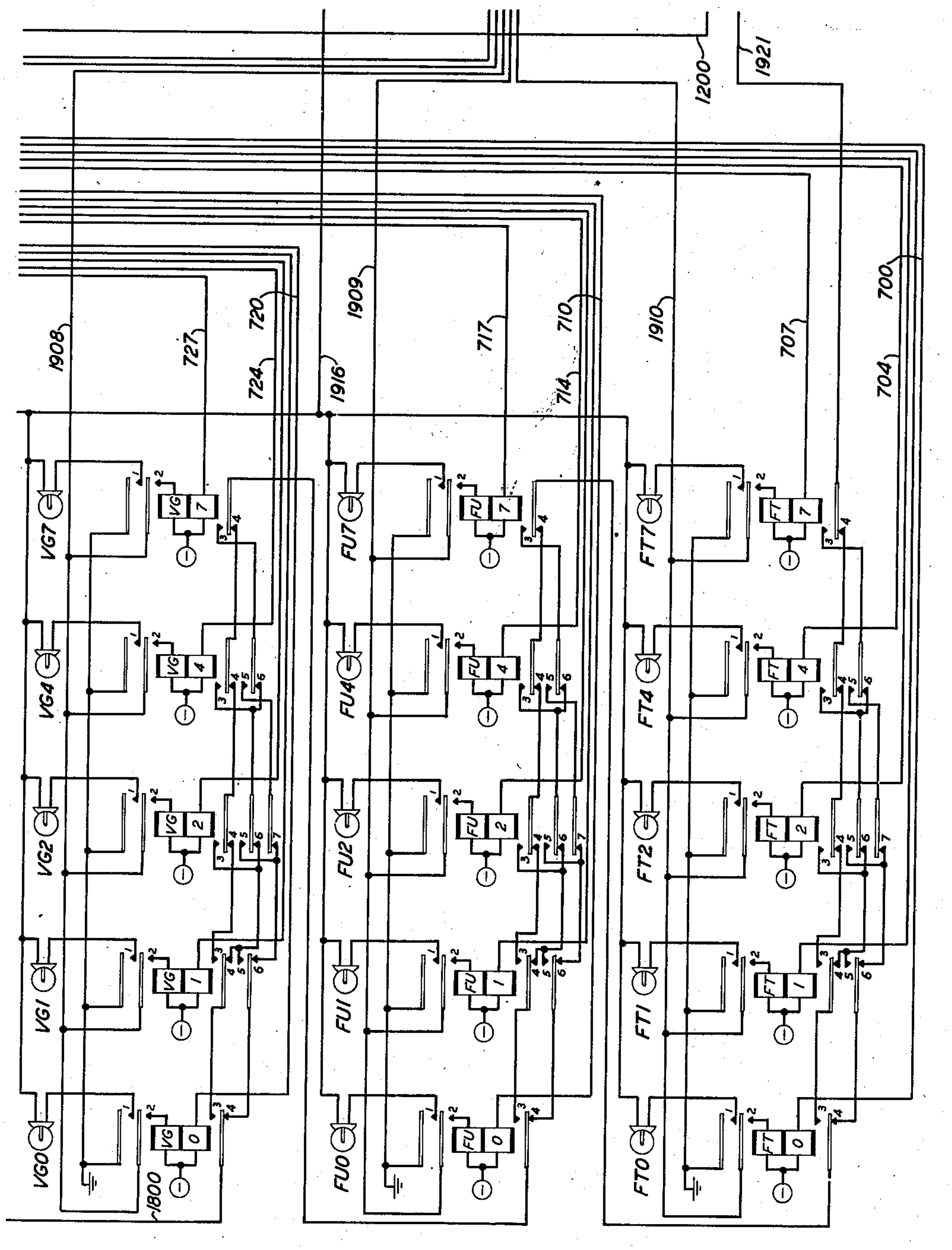
Figure 19:
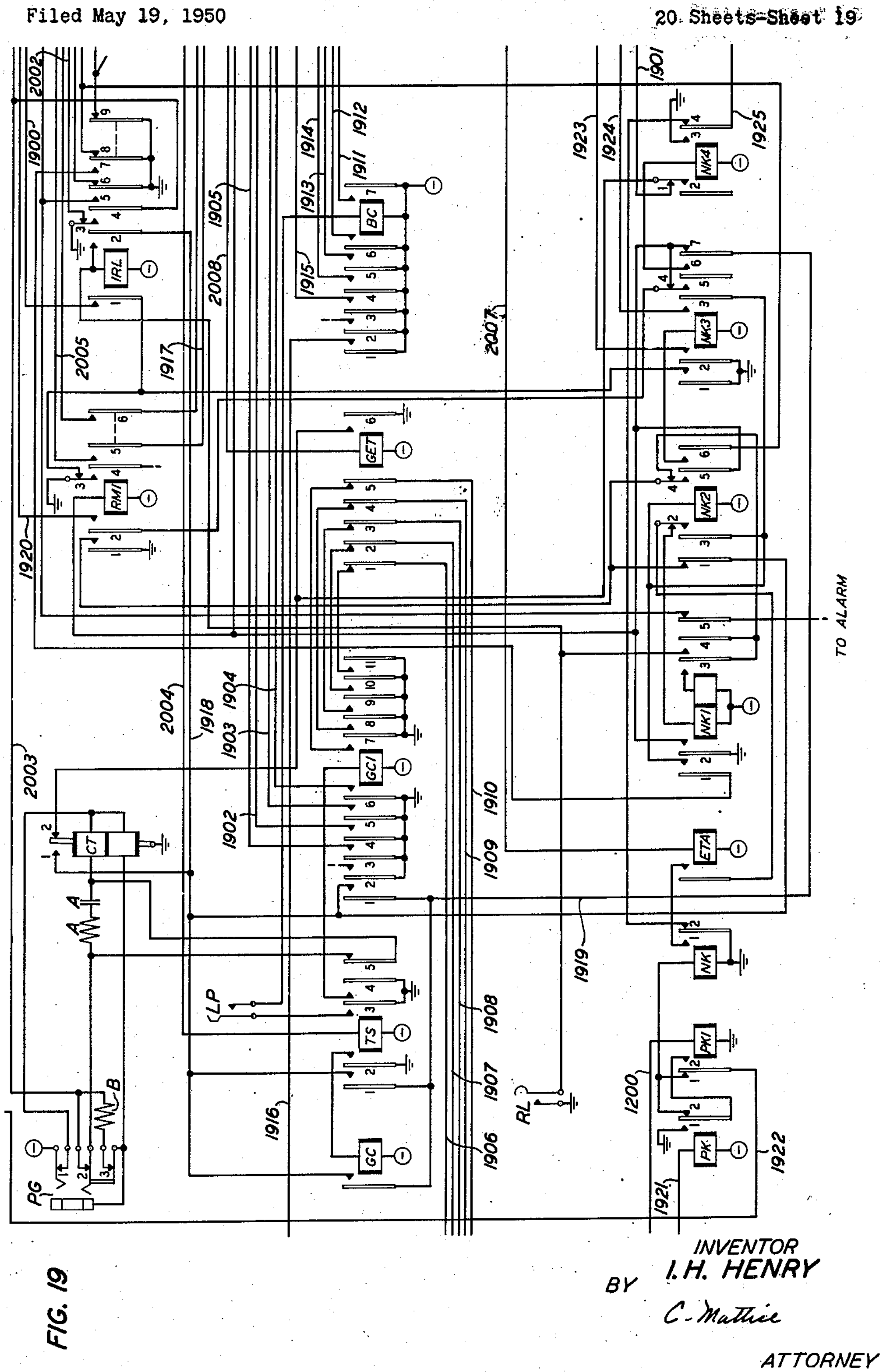
Figure 20:
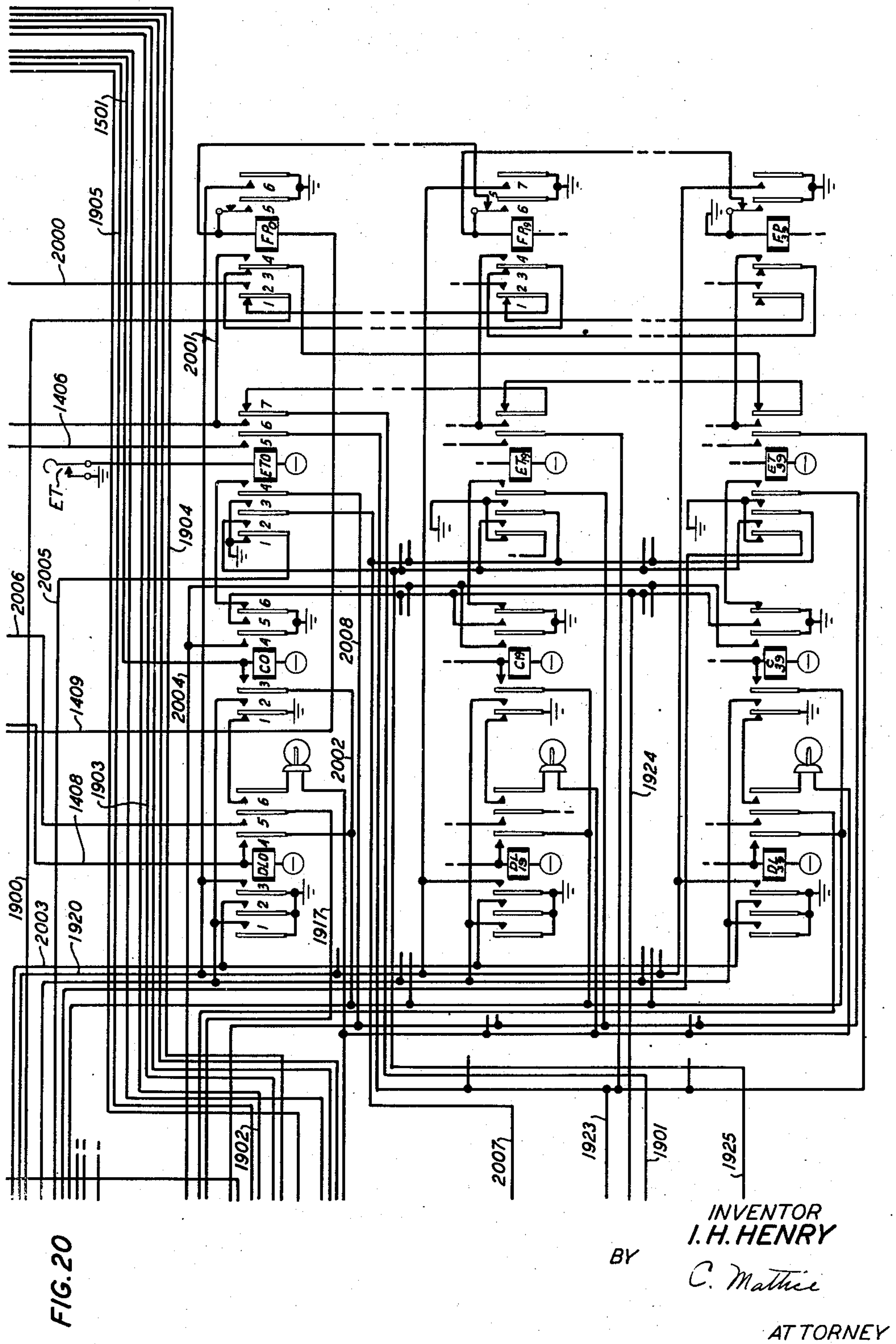

Relay TS(19) in operating closes obvious circuits for operating relay GC(19) and relay GC1(19). Relay GC1(19) connects ground directly to conductors 1902, 1903, 1904, 1905, etc., to provide locking circuits for the register relays of Fig. 15. It also connects ground over back contacts of relay GET(19) to conductors 1906 to 1910 to provide locking circuits for the line location register relays of Figs. 12 and 18. In addition, relays GC(19) and GC1(19) connect conductors 1918 and 1919 together in parallel with contact 1 of relay TS(19).

Relay TI(14), when operated to call in the trouble indicator, grounds conductor 1413 to sound a minor alarm. The attendant, in response to this alarm, operates key LP(19), closing a circuit from ground over contact 3 of relay TS(19), contact of key LP(19) to battery through the winding of relay BC(19). Relay BC(19) connects battery to conductors 1911 to 1916 to supply battery to the lamps which have been grounded by the register relays. From the lamps lighted the attendant can determine the equipment involved in the connection that failed and an approximation of the cause of the failure.

When relay RM1(19) operates at the end of the time interval measured by relay CT(19) as above described, it disconnects ground from conductor 1900, opening the circuit of relay CI(15) which releases, in turn releasing relays TIC(14), and SGC(9). At the same time a circuit is closed from ground at contact 1 of relay ET0(20), conductor 2005, contact 5 of relay RM1(19), conductor 1917, contact 5 of relay DL0(20), conductor 2006, contact 4 of relay TI(14) to battery through the winding of relay AL(14). Relay AL(14) serves to bring about the release of the sender link and controller circuit. It closes an obvious circuit for relay TB(14) which opens the circuit of relay TI(14). Relay TI(14) releases in turn operation of relay CT(19) as above described, disconnecting the sender link control circuit from the trouble indicator. The release of relay FP0(20) releases relay CTI(7), which connects ground to conductor 700 to operate relay RL(14) when the other sender link control functions are completed.

If during the time that the trouble indicator has been serving this sender link and controller circuit, other such circuits have attempted to seize the trouble indicator, the corresponding DL relay will have been operated and the corresponding FP relay may or may not have been operated, depending on its position in the preference chain. The FP relays are ineffective as long as relay FP0(20) is operated, while the DL relays are locked to ground over conductor 2002 and prepare circuits for the corresponding lamps to show which sender link and controller circuits have been in trouble. When relay RM1(19) operates it connects ground over contacts 5 of all operated DL relays to operate the AL relays of the associated sender link and controller circuits to bring about their release. At the same time the removal of ground from conductor 1900 prevents the operation of any connector relays prior to the release of the FP relays.

When the attendant has noted the information indicated by the lighted lamps of the trouble indicator, he operates key RL(19), operating relay IRL(19), which further opens the connection of ground to conductor 1900, and locks over its contact 2 and conductor 1918 to ground supplied by relays CT(19) and RM1(19). Relay IRL(19) disconnects ground from conductor 2002 to release relays C0(20), DL0(20) and any other operated DL and C relays. The release of relay C0(20) in turn releases relay TS(19) and relays GC(19) and GC1(19). The release of relay TS(19) restores the shunt around condenser A(19) and resistance A(19) causing relay CT(19) to open its contact 1, disconnecting ground at that contact from conductor 1918, and reclosing its contact 2. The release of relays TS(19), GC(19) and GC1(19) opens one locking circuit of relay RM1(19) and the release of relay DL(20), with relay FP(20) previously released, opens the other locking circuit for relay RM1(19), causing that relay to release and complete the removal of ground from conductor 1918, thereby permitting relay IRL(19) to release, assuming that key RL(19) is operated only momentarily. The trouble indicator is now free to be used for indicating other troubles.

*Check of line location identification*

As set forth heretofore, when the automatic message accounting equipment fails to receive a complete calling line identification, it calls in the transverter trouble indicator. Among the items shown by the transverter trouble indicator is the identity of the district junctor over which the call was extended and also of the frame on which the district junctor is located. Since there is one sender link and controller circuit individual to each district junctor frame, the identity of the sender link and controller circuit, through which the incomplete calling line identification was passed, is readily determined.

Assuming that the sender link and controller circuit shown is involved, all of the line identifications passed through this controller circuit will be checked until a faulty identification is detected.

For this purpose locking key ET(20) individual to this control circuit is operated, thereby operating relay ET0(20). Relay ET0(20) at its contact 3 closes a circuit from ground over conductor 2007 to battery through the winding of relay ETA(19) operating the latter relay. Relay ET0(20) also closes a circuit from ground at contact 6 of relay C0(20), contact 4 of relay ET0(20), conductor 2008 to battery through the winding of relay GET(19). Relay GET(19) operates and opens the locking circuits for the line location registers and closes a circuit from ground over its contact 6, contact 1 of relay NK4(19), conductor 1901, contact 6 of relay ET0(20), conductor 2001 to battery through the winding of relay CTI(7). Relay CTI(7) operates in this circuit, in turn operating relay TIR(7) which connects the line identification register relays of the trouble indicator to the line identification conductors as extended through the sender link and controller circuit as described. Therefore, each time that the sender control circuit is used and a calling line identification is passed through it to a sender, the line identification registers of the trouble indicator are operated. With relay CTI(7) operated, the circuit previously traced for operating relay RL(14) to release the sender control circuit, is opened.

In the meantime any other sender link and controller circuit may call in the trouble indicator by operating its associated FP relay and may record all of the information regarding the attempted connection with the exception of the line identification. With relay ET0(20) operated, the circuit for operating the relay CTI of such other sender link and controller circuit is opened at contact 7 of relay ET0(20).

Whenever the sender link and controller circuit, with which the line location registers of the trouble indicator are connected, is seized and relays GR(6) and CR0(8) are operated to transfer the line location to the sender, the line location registers of the trouble indicator are operated. Assuming that a line location consisting of a frame number 16, vertical group number 4, horizontal group number 8 and vertical file number 9 is being transmitted, frame tens relays FT0(18) and FT1(18), frame units relays FU2(18) and FU4(18), vertical group relays VG0(18) and VG4(18), horizontal group relays HG1(12) and HG7(12), and vertical file relays VF2(12) and VF7(12) should be operated.

If these relays are operated, showing that two and only two conductors have been grounded in each group, a checking circuit is completed, which may be traced from battery through the winding of relay PK(19), conductor 1921, contacts 4 of relays FT7(18), FT4(18) and FT2(18), contacts 3 of relays FT1(18) and FT0(18), contact 4 of relay FU7(18), contact 3 of relay FU4(18), contact 5 of relay FU2(18), contact 6 of relay FU1(18), contact 4 of relay FU0(18), contact 4 of relay VG7(18), contact 3 of relay VG4(18), contact 6 of relay VG2(18), contact 4 of relay VG1(18), contact 3 of relay VG0(18), conductor 1800, contact 3 of relay HG7(12), contact 6 of relay HG4(12), contact 6 of relay HG2(12), contact 5 of relay HG1(12), contact 4 of relay HG0(12), contact 3 of relay VF7(12), contact 6 of relay VF4(12), contact 5 of relay VF2(12), contact 6 of relay VF1(12), contact 4 of relay VF0(12), conductor 1200 to ground through the winding of relay PK1(19).

If this checking circuit is complete, relays PK(19) and PK1(19) operate, completing a circuit from ground over contact 1 of relay PK(19), contact 2 of relay PK1(19), conductor 1922, contact 11 of relay TIR(7), contact 2 of relay CTI(7), to conductor 700. When the sender link and controller circuit is ready to release, ground thus connected to conductor 700 is connected to battery through the winding of the release relay RL(14) to release the controller circuit.

If in any of the line location registers, less than two or more than two relays are operated, the above-traced checking circuit cannot be completed and neither relay PK(19) nor relay PK1(19) can operate. In this case ground through the winding of no check relay NK(19) is connected over contact 1 of relay PK1(19) to conductor 1922 instead of direct ground. When the sender link and controller circuit closes the circuit for relay RL(14), relay NK(19) operates, but the resistance of the latter relay is great enough to prevent the operation of relay RL(14). Relay NK(19) is also connected to conductor 1922 and operated if either relay PK(19) or PK1(19) fails to operate due to a ground or battery cross.

If relay NK(19) is operated, it closes a circuit from ground over its contact 1, contact of relay ETA(19), contact 2 of relay NK2(19), to battery through the left winding of relay NK1(19). Relay NK1(19) operates and, at its contact 2, closes an obvious circuit for operating relay RM1(19). With relay RM1(19) operated, relay NK1(19) locks in a circuit from battery through its right winding and over its contact 3, contact 4 of relay NK2(19), to ground at contact 1 of relay RM1(19). Relay NK1(19) also extends its locking ground over its contact 4 to battery through the winding of relay IRL(19).

If any other sender link and controller circuit is using the trouble indicator or attempts to seize it, the operation of relay RM1(19) operates the AL relay of such sender link and controller circuit to release the trouble indicator therefrom, but, since relay ET0(20) is operated, cannot operate relay AL(14) of the controller circuit on which the line identification failure occurred.

Relay IRL(19) opens the locking circuit for relays DL0(20) and C0(20) as well as for all other DL and C relays, thereby releasing relay TS(19), if operated, to close the shunt around condenser A(19) and resistance A(19). At its contact 4, relay IRL(19) connects ground to conductor 2003 to cause relay CT(19) to close its contact 2. At its contact 7, relay IRL(19) closes a circuit from ground at that contact, over contact 1 of relay NK1(19) to battery through the winding of relay NK2(19). At its contact 1 relay IRL(19) opens the circuit by which CI(15) would be operated, thereby releasing the corresponding relay and other connector relays in any sender link and controller circuit which may have been using the trouble indicator. Relay IRL(19) is locked as previously described so as to release only after the trouble indicator has restored to normal.

Relay NK2(19) operates in the circuit above traced, closing a locking circuit for itself over its contact 3, contact of relay ETA(19) to ground at contact 1 of relay NK(19). At its contact 4, relay NK2(19) opens the operating circuit for relay IRL(19) and the locking circuit for relay NK1(19), and at its contact 2 opens the operating circuit for relay NK1(19) so that relay NK1(19) releases. At its contact 5, relay NK2(19) closes a locking circuit for relay RM1(19) but at its contact 1 opens the circuit by which relay IRL(19) is normally locked under the control of relay RM1(19), to permit relay IRL(19) to release even though relay RM1(19) is held operated.

When relay IRL(19) releases, a circuit is closed from battery through the winding of relay NK3(19), contact 6 of relay NK2(19) contact 8 of relay IRL(19) to ground, operating relay NK3(19).

With relay NK3(19) operated, a circuit is closed from ground at contact 2 of relay NK3(19), conductor 1923, contact 5 of relay ET0(20), conductor 1406, contact of relay TB(14), contact 1 of relay TIB(14) to battery through the winding of relay TI(14). Relay TI(14) operates relays FP0(20) and DL0(20). With relay FP0(20) operated, the circuit of relay CI(15) is closed as previously traced to conductor 1900 whence it extends over contact 1 of relay IRL(19) to ground at contact 1 of relay NK3(19). Relay CI(15) operates the other connector relays and also relay C0(20) as previously described, the latter relay opening the circuit of relay GET(19) so that the line location register relays may lock. Relay GET(19) at its contact 6 opens the auxiliary circuit for relay CTI(7). Relay C0(20) operates relay TS(19) which operates relays GC(19) and GC1(19) and opens the shunt around condenser A(19) and resistance A(19), causing relay CT(19) to measure a time interval as previously described. Relay C0(20) also closes a holding circuit for relay NK2(19) which may be traced from battery through the winding of relay NK2(19), contact 3 of relay NK3(19), conductor 1924 to ground at contact 5 of relay C0(20).

A complete record of the equipment involved in the line location failure is now made and locked in.

When relay CT(19) closes its contact 1, it completes a circuit over conductor 1918, contact 1 of relay TS(19), conductor 1919, contact 6 of relay NK3 to battery through the winding of relay NK4(19). The operation of relay NK4(19) closes a circuit from ground at contact 3 of relay NK4(19), conductor 1925, contact 2 of relay ET0(20), conductor 2005, contact 5 of relay RM1(19), conductor 1917, contact 5 of relay DL0(20), conductor 2006, contact 4 of relay TL(14) to battery through the winding of relay AL(14) to bring about the release of the sender link control circuit from the trouble indicator. Relay CT(19) at its contact 2 opens the circuit over which relay CTI(7) was operated in order to release relay TIR(7), and disconnect the line location registers from the line location transfer conductors in the sender link and controller circuit so that, if the controller circuit is used for another call before the trouble indicator is released by the attendant, it will not interfere with the locked-in line location and also to permit relay RL(14) to operate and release the sender link and controller circuit.

From the record shown on the trouble indicator, the attendant may determine which item of the line location registration was at fault and the line link frame on which the line is located, together with other details which may be of assistance in tracing the source of the trouble. Having noted the information provided, the attendant operates release key RL(19), operating relay IRL(19) which releases relays DL0(20) and C0(20). Relay C0(20) in releasing, opens the holding circuit for relay NK2(19), which releases, in turn releasing relays RM1(19), NK3(19) and NK4(19). Relay C0(20) also releases relay TS(19), and reoperates relay GET(19), relay TS(19) in turn releasing relays CT(19), GC(19) and GC1(19), followed by relay IRL(19).

What is clained is:

1. In a telephone system including calling lines, district junctors, register senders and link switches, common control circuits for selectively operating said link switches to connect one of said calling lines with one of said district junctors and one of said register senders, line identifying means in said control circuits for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, and manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit.

2. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, and means responsive to a false operation of said line identification registers while individual to said one control circuit to operate the second connector of said one control circuit to also operate said equipment identification registers under the control of said equipment selecting means.

3. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, and means effective while said line identification registers are individual to said one control circuit to render the second connectors of other control circuits operable to permit the operation of said equipment identification registers under the control of the equipment selecting means of said other control circuits.

4. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, means responsive to a false operation of said line identification registers while individual to said one control circuit to operate the second connector of said one control circuit to cause the operation of said equipment identification registers under the control of the equipment selecting means of said one control circuit, means normally under manual control for releasing said equipment identification registers, and means responsive to said false operation of said line identification registers to release said equipment identification registers if previously operated.

5. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, checking means operated in response to the correct operation of said line identification registers and means to release said one control circuit under the control of said checking means.

6. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, means effective while said line identification registers are individual to said one control circuit to render the second connectors of other control circuits operable to permit the operation of said equipment identification registers under the control of the equipment selecting means of said other control circuits, means responsive to a false operation of said line identification registers while individual to said one control circuit to disable the second connectors of all other control circuits and to release said equipment identification registers if operated, and means to operate the second connector of said one control circuit to cause the operation of said equipment identification registers under the control of the equipment selecting means of said one control circuit.

7. In a telephone system including calling lines, district junctors, register senders and link switches, common control circuits for selectively operating said link switches to connect one of said calling lines with one of said district junctors and one of said register senders, line identifying means in said control circuit for identifying a calling line, equipment selecting means in said control circuits for selecting the district junctor, sender and link switches to be used in a connection, a control circuit connector, means responsive to the initiation of a call on one of said calling lines to operate said control circuit connector to connect said calling line with one of said control circuits, means responsive to the connection of said calling line with said one control circuit to operate the line identifying means and the equipment selecting means of said one control circuit, a trouble indicator common to said control circuits, including line identity registers and equipment identity registers, connecting means in said control circuits comprising a first connector for connecting said line identifying means with said line identity registers and a second connector for connecting said equipment selecting means with said equipment identity registers, timing means in said control circuits, means responsive to the connection of said calling line with said one control circuit to start the operation of the timing means of said one control circuit, means operated by the timing means of said one control circuit to operate the connecting means of said one control circuit to connect said one control circuit with said trouble indicator, means responsive to the operation of said first and second connectors to operate said line identity registers under the control of said line identifying means and said equipment identity registers under the control of said equipment selecting means, manually controlled means for operating said first connector in any one of said control circuits to render said line identification registers individual to the line identifying registers of said one control circuit independent of said equipment identification registers, whereby said line identification registers are operated in response to each operation of the line identifying means of said one control circuit, means effective while said line identification registers are individual to said one control circuit to render the second connectors of other control circuits operable to permit the operation of said equipment identification registers under the control of the equipment selecting means of said other control circuits, means normally under manual control to release said equipment identification registers, means responsive to a false operation of said line identification registers while individual to said one control circuit to disable the second connectors of all other control circuits and to release said equipment identification registers if operated, and means to operate the second connector of said one control circuit to cause the operation of said equipment identification registers under the control of the equipment selecting means of said one control circuit.

ISRAEL H. HENRY.

References Cited in the file of this patent

UNITED STATES PATENTS

| Number | Name | Date |
|---|---|---|
| 1,594,003 | Carpenter | July 27, 1926 |
| 1,623,777 | Carpenter | Apr. 5, 1927 |
| 1,848,174 | Irvine et al. | Mar. 8, 1932 |
| 2,369,071 | Ostline | Feb. 6, 1945 |
| 2,522,000 | Shepherd | Sept. 12, 1950 |